United States Patent
Ma et al.

(10) Patent No.: US 12,326,743 B2
(45) Date of Patent: Jun. 10, 2025

(54) ENERGY STORAGE SYSTEM, TEMPERATURE CONTROL METHOD, AND PHOTOVOLTAIC POWER GENERATION SYSTEM

(71) Applicant: Huawei Digital Power Technologies Co., Ltd., Shenzhen (CN)

(72) Inventors: Hui Ma, Shenzhen (CN); Zhipeng Wu, Shenzhen (CN); Hao Meng, Dongguan (CN); Zhirun Li, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/506,619

(22) Filed: Nov. 10, 2023

(65) Prior Publication Data
US 2024/0077897 A1    Mar. 7, 2024

Related U.S. Application Data

(63) Continuation of application No. PCT/CN2022/092194, filed on May 11, 2022.

(30) Foreign Application Priority Data

May 11, 2021 (CN) .......................... 202110512546.5

(51) Int. Cl.
*G05D 23/20* (2006.01)
*H02J 3/32* (2006.01)
(Continued)

(52) U.S. Cl.
CPC ................ *G05D 23/20* (2013.01); *H02J 3/32* (2013.01); *H02J 3/38* (2013.01); *H02J 7/0013* (2013.01);
(Continued)

(58) Field of Classification Search
CPC ...... G05D 23/20; H02J 7/007102; H02J 7/00; H02J 3/32; H02J 3/38; H02J 7/0013;
(Continued)

(56) References Cited

FOREIGN PATENT DOCUMENTS

| CN | 103050986 A | 4/2013 |
|---|---|---|
| CN | 103395375 A | 11/2013 |

(Continued)

*Primary Examiner* — Robert L Deberadinis
(74) *Attorney, Agent, or Firm* — Slater Matsil, LLP

(57) ABSTRACT

In accordance with an embodiment, an energy storage system includes energy storage container that a temperature control system, a battery cluster, and a controller. The controller determines a specified temperature of the temperature control system corresponding to a maximum difference between an available capacity of the battery cluster and a power consumption of the temperature control system as a target temperature. The determination of the specified temperature is based on: a correspondence between the available capacity of the battery cluster and a plurality of different specified temperatures in a specified temperature set of the temperature control system, and a correspondence between the power consumption of the temperature control system and the plurality of different specified temperatures in the specified temperature set of the temperature control system. The temperature control system is configured to adjust a temperature inside the energy storage container to the target temperature.

20 Claims, 12 Drawing Sheets

(51) Int. Cl.
*H02J 3/38* (2006.01)
*H02J 7/00* (2006.01)
*H02J 7/35* (2006.01)

(52) U.S. Cl.
CPC ...... *H02J 7/0047* (2013.01); *H02J 7/007192* (2020.01); *H02J 7/35* (2013.01); *H02J 2207/20* (2020.01); *H02J 2300/24* (2020.01)

(58) Field of Classification Search
CPC ........ H02J 7/0047; H02J 7/35; H02J 2207/20; H02J 2300/24
See application file for complete search history.

(56) References Cited

FOREIGN PATENT DOCUMENTS

| | | | |
|---|---|---|---|
| CN | 106549416 | A | 3/2017 |
| CN | 112217270 | A | 1/2021 |
| CN | 113394800 | A | 9/2021 |

```
                                                     ┌─ S501
┌────────────────────────────────────────────────────┴──────────────────────────────────────────────┐
│ Determine, based on a correspondence between an available capacity of a battery cluster and a     │
│    plurality of different specified temperatures in a specified temperature set of a temperature  │
│  control system and a correspondence between power consumption of the temperature control        │
│ system and the plurality of different specified temperatures in the specified temperature set of  │
│       the temperature control system, that a specified temperature, of the temperature control    │
│  system, corresponding to a maximum difference between the available capacity of the battery     │
│   cluster and the power consumption of the temperature control system is a target temperature    │
└───────────────────────────────────────────┬───────────────────────────────────────────────────────┘
                                            │                          ┌─ S502
                                            ▼                          │
┌──────────────────────────────────────────────────────────────────────┴────────────────────────────┐
│            Adjust a temperature inside an energy storage container to the target temperature      │
└───────────────────────────────────────────────────────────────────────────────────────────────────┘
```

FIG. 9

ENERGY STORAGE SYSTEM, TEMPERATURE CONTROL METHOD, AND PHOTOVOLTAIC POWER GENERATION SYSTEM

CROSS-REFERENCE TO RELATED APPLICATIONS

This application is a continuation of International Application No. PCT/CN2022/092194, filed on May 11, 2022, which claims priority to Chinese Patent Application No. 202110512546.5, filed on May 11, 2021. The disclosures of the aforementioned applications are hereby incorporated by reference in their entireties.

TECHNICAL FIELD

This application relates to the field of energy storage systems, and in particular, to an energy storage system, a temperature control method, and a photovoltaic power generation system.

BACKGROUND

With aggravation of energy shortage and environmental pollution problems in modern society, currently, power generation manners such as photovoltaic power generation and wind power generation are widely applied. In addition, with development of electrochemical battery technologies and a sharp increase of productivity, costs of an electrochemical battery decrease, and this brings opportunities for the electrochemical battery to participate in power energy storage of a new energy power generation system. Because an energy storage system that uses the electrochemical battery has features such as flexibility, controllability of charge and discharge, a quick response capability, and high energy density, the energy storage system that uses the electrochemical battery is increasingly and widely used in various processes such as power generation, power transmission, power transformation, power distribution, and power consumption.

A temperature control system of the energy storage system is located inside an energy storage container and mainly includes an air conditioner and a fan. The air conditioner is configured to adjust temperatures of a battery module during storage and running, and the fan is configured to adjust a gas flow speed. That the air conditioner performs refrigerating is used as an example. When a return air temperature of the air conditioner is greater than a specified temperature of the temperature control system, the air conditioner performs refrigerating. When the return air temperature of the air conditioner reaches the specified temperature of the temperature control system, refrigerating is completed. In this case, a temperature inside the energy storage container reaches the specified temperature of the temperature control system.

In a current solution, a temperature, inside an energy storage container, corresponding to a maximum available capacity of a battery cluster is usually selected as a specified temperature of a temperature control system, and the specified temperature of the temperature control system is an optimal working temperature of the battery cluster. However, in this solution, the temperature inside the energy storage container keeps being controlled at an optimal temperature, and this increases power consumption of the temperature control system and reduces running efficiency of an energy storage system.

SUMMARY

Some embodiments provide an energy storage system, a temperature control method, and a photovoltaic power generation system, to improve running efficiency of the energy storage system.

According to a first aspect, this application provides an energy storage system. In a typical application scenario, the energy storage system stores electricity in a low power consumption period, and releases the stored electricity in a peak power consumption period. The energy storage system includes at least one energy storage container, and each energy storage container includes a temperature control system, a battery cluster, and a controller. The battery cluster includes a plurality of battery modules connected in series, each battery module includes a plurality of batteries, and the plurality of batteries in the battery module may be connected in series or in parallel-series. The controller determines, based on a correspondence between an available capacity of the battery cluster and a plurality of different specified temperatures in a specified temperature set of the temperature control system and a correspondence between power consumption of the temperature control system and the plurality of different specified temperatures in the specified temperature set of the temperature control system, that a specified temperature, of the temperature control system, corresponding to a maximum difference between the available capacity of the battery cluster and the power consumption of the temperature control system is a target temperature. The temperature control system adjusts a temperature inside the energy storage container to the target temperature.

The specified temperature of the temperature control system is a temperature that the temperature control system controls to finally reach inside the energy storage container, and is also a final temperature of a working environment of the battery cluster. According to this solution provided in this embodiment of this application, in one aspect, impact of the specified temperature of the temperature control system on the available capacity of the battery cluster when the battery cluster works at different specified temperatures of the temperature control system is considered. In another aspect, impact of the specified temperature of the temperature control system on the power consumption of the temperature control system is further considered. To be specific, when the temperature control system performs heating, a higher specified temperature of the temperature control system indicates higher power consumption of the temperature control system, and a lower specified temperature of the temperature control system indicates lower power consumption of the temperature control system. When the temperature control system performs refrigerating, a higher specified temperature of the temperature control system indicates lower power consumption of the temperature control system, and a lower specified temperature of the temperature control system indicates higher power consumption of the temperature control system. When the difference between the available capacity of the battery cluster and the power consumption of the temperature control system is maximum, it indicates that a ratio of the power consumption of the temperature control system to the available capacity of the battery cluster is minimum, and in this case, the energy storage system has the highest running efficiency. Therefore, the specified temperature, of the temperature control system, corresponding to the maximum difference between the available capacity of the battery cluster and the power consumption of the temperature control system is used as the target temperature, so that the temperature control system adjusts the temperature inside the energy storage container to the target temperature. In this way, running efficiency of the energy storage system can be improved.

In a possible implementation, a correspondence between available capacities of the battery cluster in different working states and the plurality of different specified temperatures in the specified temperature set of the temperature control system is pre-calibrated and stored.

During actual application, when the battery cluster is charged, a correspondence between available capacities, of the battery cluster, corresponding to different charging rates and the plurality of different specified temperatures in the specified temperature set of the temperature control system may be pre-calibrated. When the battery cluster is discharged, a correspondence between available capacities, of the battery cluster, corresponding to different discharging rates and the plurality of different specified temperatures in the specified temperature set of the temperature control system may be pre-calibrated. When the battery cluster is in a silent state, a correspondence between available capacities, of the battery cluster, corresponding to different states of charge and the plurality of different specified temperatures in the specified temperature set of the temperature control system may be pre-calibrated. A corresponding correspondence is determined based on a current working state of the battery cluster, and impact of different working states of the battery cluster on the correspondence between an available capacity of the battery cluster and a plurality of different specified temperatures in a specified temperature set of the temperature control system is fully considered.

In a possible implementation, when the battery cluster is in a charging state, the controller determines a correspondence between an available capacity of the battery cluster at a current charging rate and the plurality of different specified temperatures in the specified temperature set of the temperature control system. When the battery cluster is in a discharging state, the controller determines a correspondence between an available capacity of the battery cluster at a current discharging rate and the plurality of different specified temperatures in the specified temperature set of the temperature control system. When the battery cluster is in a silent state, the controller determines a correspondence between an available capacity of the battery cluster in a current state of charge and the plurality of different specified temperatures in the specified temperature set of the temperature control system.

That is, the controller determines a corresponding correspondence based on a current working state of the battery cluster.

In a possible implementation, the temperature control system includes a plurality of air conditioners and a plurality of fans. The plurality of fans are configured to adjust gas flow speeds around the plurality of battery modules. The plurality of air conditioners are configured to adjust the temperature inside the energy storage container. The controller is specifically configured to: determine a correspondence between total power consumption of a turned-on air conditioner and the plurality of different specified temperatures in the specified temperature set of the temperature control system, determine total power consumption of a turned-on fan, and determine the correspondence between power consumption of the temperature control system and the plurality of different specified temperatures in the specified temperature set of the temperature control system based on the total power consumption of the turned-on fan and the correspondence between total power consumption of a turned-on air conditioner and the plurality of different specified temperatures in the specified temperature set of the temperature control system.

The power consumption of the temperature control system is power consumption of all turned-on air conditioners and power consumption of all turned-on fans. The controller separately determines the two parts of power consumption and then adds the power consumption, that is, determines the power consumption of the temperature control system.

In a possible implementation, all of the plurality of fans are turned on, and the controller determines rotational speeds of the plurality of fans based on temperatures of the plurality of battery modules; and determines total power consumption of the plurality of fans based on a total quantity of the plurality of fans and the rotational speeds of the plurality of fans.

The rotate speed of the fan is determined by the temperature of the battery module. When the air conditioner performs refrigerating, a higher temperature of the battery module indicates a higher rotate speed of the fan, and a lower temperature of the battery module indicates a lower rotate speed of the fan. When the air conditioner performs heating, a lower temperature of the battery module indicates a higher rotate speed of the fan, and a higher temperature of the battery module indicates a lower rotate speed of the fan. A relationship between the rotate speed of the fan and the temperature of the battery module may be preset. A relationship between a rotate speed of one fan and power consumption of the fan is pre-calibrated.

In a possible implementation, the controller determines a quantity of turned-on fans and rotational speeds of the turned-on fans based on temperatures of the plurality of battery modules; and determines total power consumption of the turned-on fans based on the quantity of turned-on fans and the rotational speeds of the turned-on fans.

In this case, the quantity of turned-on fans is determined by the temperature of the battery module. When the air conditioner performs refrigerating, a higher temperature of the battery module indicates more turned-on fans, and a lower temperature of the battery module indicates fewer turned-on fans. When the air conditioner performs heating, a lower temperature of the battery module indicates more turned-on fans, and a higher temperature of the battery module indicates fewer turned-on fans. A relationship between the quantity of turned-on fans and the temperature of the battery module may be preset.

In a possible implementation, the controller determines a correspondence between a total refrigerating capacity required by the energy storage container and the plurality of different specified temperatures in the specified temperature set of the temperature control system, and determines a correspondence between a refrigerating capacity of one air conditioner and the plurality of different specified temperatures in the specified temperature set of the temperature control system.

Then, the controller determines a correspondence between a quantity of turned-on air conditioners and the plurality of different specified temperatures in the specified temperature set of the temperature control system based on the correspondence between a total refrigerating capacity required by the energy storage container and the plurality of different specified temperatures in the specified temperature set of the temperature control system and the correspondence between a refrigerating capacity of one air conditioner and the plurality of different specified temperatures in the specified temperature set of the temperature control system.

Then, the controller determines the correspondence between total power consumption of a turned-on air conditioner and the plurality of different specified temperatures in the specified temperature set of the temperature control system based on the correspondence between a quantity of turned-on air conditioners and the plurality of different specified temperatures in the specified temperature set of the temperature control system and a correspondence between power consumption of one air conditioner and the plurality of different specified temperatures in the specified temperature set of the temperature control system.

In a possible implementation, when determining the correspondence between a total refrigerating capacity required by the energy storage container and the plurality of different specified temperatures in the specified temperature set of the temperature control system, the controller determines, based on solar radiation intensity and an outer surface area of the energy storage container, heat transferred by solar heat radiation to the inside of the energy storage container; determines, based on a heat transfer coefficient of the energy storage container, the outer surface area of the energy storage container, and a current temperature outside the energy storage container, a correspondence between heat transferred from the outside of the energy storage container to the inside of the energy storage container through heat conduction and the plurality of different specified temperatures in the specified temperature set of the temperature control system; and determines, based on working time of the plurality of battery modules, working currents of the plurality of battery modules, internal resistances of the plurality of battery modules, and open circuit voltages of the plurality of battery modules, heat generated during working of the plurality of battery modules.

The controller adds the foregoing three parts of heat, to determine the correspondence between a total refrigerating capacity required by the energy storage container and the plurality of different specified temperatures in the specified temperature set of the temperature control system.

In a possible implementation, the controller determines the working time of the plurality of battery modules and the working currents of the plurality of battery modules based on received running information.

The running information is sent by an upper computer of the controller, and the upper computer may be a smart array control unit (SACU).

In a possible implementation, a correspondence between refrigerating capacities, of one air conditioner, corresponding to different temperatures outside the energy storage container and the plurality of different specified temperatures in the specified temperature set of the temperature control system is pre-calibrated and stored. The controller determines a correspondence between a refrigerating capacity, of one air conditioner, corresponding to a current temperature outside the energy storage container and the plurality of different specified temperatures in the specified temperature set of the temperature control system.

In a possible implementation, a correspondence between power consumption, of one air conditioner, corresponding to different temperatures outside the energy storage container and the plurality of different specified temperatures in the specified temperature set of the temperature control system is pre-calibrated and stored. The controller determines a correspondence between power consumption, of one air conditioner, corresponding to a current temperature outside the energy storage container and the plurality of different specified temperatures in the specified temperature set of the temperature control system.

In a possible implementation, a quantity of the plurality of fans is the same as a quantity of the plurality of battery modules, and one fan is configured to adjust a gas flow speed around one corresponding battery module.

In this case, to balance temperatures of the battery modules, the plurality of fans are usually set to be turned on at the same time and have a same rotate speed.

In a possible implementation, the controller includes a first control unit and a plurality of second control units. A quantity of the plurality of second control units is the same as the quantity of the plurality of fans, and one second control unit is configured to control a working state of one corresponding fan. The first control unit is configured to control working states of the plurality of air conditioners.

The first control unit may be a container monitoring unit (CMU), and the second control unit may be a battery monitoring unit (BMU). Each second control unit may further monitor a working state of one corresponding battery module, for example, detect a temperature and an SOC of the corresponding battery module.

In a possible implementation, one second control unit is further configured to: detect a temperature of one corresponding battery module, and send a temperature detection result of the battery module to the first control unit.

In a possible implementation, the energy storage system further includes a first temperature sensor. The first temperature sensor is disposed outside the energy storage container. The first temperature sensor is configured to: detect a temperature outside the energy storage container, and send a detection result to the controller.

The controller determines a correspondence between a corresponding refrigerating capacity of one air conditioner and the plurality of different specified temperatures in the specified temperature set of the temperature control system and a correspondence between corresponding power consumption of one air conditioner and the plurality of different specified temperatures in the specified temperature set of the temperature control system based on a current temperature outside the energy storage container.

According to a second aspect, this application further provides a temperature control method for an energy storage system, where the method is applied to the energy storage system provided in the foregoing implementations, and the method includes:

determining, based on a correspondence between an available capacity of a battery cluster and a plurality of different specified temperatures in a specified temperature set of a temperature control system and a correspondence between power consumption of the temperature control system and the plurality of different specified temperatures in the specified temperature set of the temperature control system, that a specified temperature, of the temperature control system, corresponding to a maximum difference between the available capacity of the battery cluster and the power consumption of the temperature control system is a target temperature; and adjusting a temperature inside the energy storage container to the target temperature.

In this method, impact of the specified temperature of the temperature control system on the available capacity of the battery cluster when the battery cluster works at different specified temperatures of the temperature control system is considered, and impact of the specified temperature of the temperature control system on the power consumption of the temperature control system is further considered. When the difference between the available capacity of the battery cluster and the power consumption of the temperature control system is maximum, it indicates that a ratio of the power consumption of the temperature control system to the available capacity of the battery cluster is minimum, and in this case, the energy storage system has the highest running efficiency. Therefore, the specified temperature, of the temperature control system, corresponding to the maximum difference between the available capacity of the battery cluster and the power consumption of the temperature control system is used as the target temperature, and the temperature inside the energy storage container is adjusted to the target temperature. In this way, running efficiency of the energy storage system can be improved.

In a possible implementation, before the determining, based on a correspondence between an available capacity of a battery cluster and a plurality of different specified temperatures in a specified temperature set of a temperature control system and a correspondence between power consumption of the temperature control system and the plurality of different specified temperatures in the specified temperature set of the temperature control system, that a specified temperature, of the temperature control system, corresponding to a maximum difference between the available capacity of the battery cluster and the power consumption of the temperature control system is a target temperature, the method further includes:

pre-calibrating and storing a relationship between available capacities of the battery cluster in different working states and the specified temperature of the temperature control system.

Specifically, when the battery cluster is charged, a correspondence between available capacities, of the battery cluster, corresponding to different charging rates and the plurality of different specified temperatures in the specified temperature set of the temperature control system may be pre-calibrated. When the battery cluster is discharged, a correspondence between available capacities, of the battery cluster, corresponding to different discharging rates and the plurality of different specified temperatures in the specified temperature set of the temperature control system may be pre-calibrated. When the battery cluster is in a silent state, a correspondence between available capacities, of the battery cluster, corresponding to different states of charge and the plurality of different specified temperatures in the specified temperature set of the temperature control system may be pre-calibrated. Therefore, impact of different working states of the battery cluster on the correspondence between an available capacity of a battery cluster and a plurality of different specified temperatures in a specified temperature set of a temperature control system is fully considered.

In a possible implementation, the method further includes:

when the battery cluster is in a charging state, determining a correspondence between an available capacity of the battery cluster at a current charging rate and the plurality of different specified temperatures in the specified temperature set of the temperature control system;

when the battery cluster is in a discharging state, determining a correspondence between an available capacity of the battery cluster at a current discharging rate and the plurality of different specified temperatures in the specified temperature set of the temperature control system; and when the battery cluster is in a silent state, determining a correspondence between an available capacity of the battery cluster in a current state of charge and the plurality of different specified temperatures in the specified temperature set of the temperature control system.

In a possible implementation, the method further includes:

determining a correspondence between total power consumption of a turned-on air conditioner and the plurality of different specified temperatures in the specified temperature set of the temperature control system, and determining total power consumption of a turned-on fan; and determining the correspondence between power consumption of the temperature control system and the plurality of different specified temperatures in the specified temperature set of the temperature control system based on the total power consumption of the turned-on fan and the correspondence between total power consumption of a turned-on air conditioner and the plurality of different specified temperatures in the specified temperature set of the temperature control system.

The power consumption of the temperature control system is power consumption of all turned-on air conditioners and power consumption of all turned-on fans. The two pails of power consumption are separately determined and then added, that is, the power consumption of the temperature control system is determined.

In a possible implementation, all of the plurality of fans are turned on, and the determining total power consumption of a turned-on fan specifically includes:

determining rotational speeds of the plurality of fans based on temperatures of the plurality of battery modules; and determining total power consumption of the plurality of fans based on a total quantity of the plurality of fans and the rotational speeds of the plurality of fans.

In this implementation, a relationship between the rotate speed of the fan and the temperature of the battery module may be preset. A relationship between a rotate speed of one fan and power consumption of the fan is pre-calibrated.

In a possible implementation, the determining total power consumption of a turned-on fan specifically includes:

determining a quantity of turned-on fans and rotational speeds of the turned-on fans based on temperatures of the plurality of battery modules; and determining total power consumption of the turned-on fans based on the quantity of turned-on fans and the rotational speeds of the turned-on fans.

In this implementation, a relationship between the quantity of turned-on fans and the temperature of the battery module may be preset.

In a possible implementation, the determining a correspondence between total power consumption of a turned-on air conditioner and the plurality of different specified temperatures in the specified temperature set of the temperature control system specifically includes:

determining a correspondence between a total refrigerating capacity required by the energy storage container and the plurality of different specified temperatures in the specified temperature set of the temperature control system;

determining a correspondence between a refrigerating capacity of one air conditioner and the plurality of different specified temperatures in the specified temperature set of the temperature control system;

determining a correspondence between a quantity of turned-on air conditioners and the plurality of different specified temperatures in the specified temperature set of the temperature control system based on the correspondence between a total refrigerating capacity required by the energy storage container and the plurality of different specified temperatures in the specified temperature set of the temperature control system and the correspondence between a refrigerating capacity of one air conditioner and the plurality of different specified temperatures in the specified temperature set of the temperature control system; and determining the correspondence between total power consumption of a turned-on air conditioner and the plurality of different specified temperatures in the specified temperature set of the temperature control system based on the correspondence between a quantity of turned-on air conditioners and the plurality of different specified temperatures in the specified temperature set of the temperature control system and a correspondence between power consumption of one air conditioner and the plurality of different specified temperatures in the specified temperature set of the temperature control system.

In a possible implementation, the determining a correspondence between a total refrigerating capacity required by the energy storage container and the plurality of different specified temperatures in the specified temperature set of the temperature control system specifically includes:

determining, based on solar radiation intensity and an outer surface area of the energy storage container, heat transferred by solar heat radiation to the inside of the energy storage container;

determining, based on a heat transfer coefficient of the energy storage container, the outer surface area of the energy storage container, and a current temperature outside the energy storage container, a correspondence between heat transferred from the outside of the energy storage container to the inside of the energy storage container through heat conduction and the plurality of different specified temperatures in the specified temperature set of the temperature control system;

determining, based on working time of the plurality of battery modules, working currents of the plurality of battery modules, internal resistances of the plurality of battery modules, and open circuit voltages of the plurality of battery modules, heat generated during working of the plurality of battery modules; and determining, based on the heat transferred by solar heat radiation to the inside of the energy storage container, the correspondence between heat transferred from the outside of the energy storage container to the inside of the energy storage container through heat conduction and the plurality of different specified temperatures in the specified temperature set of the temperature control system, and the heat generated during working of the plurality of battery modules, the correspondence between a total refrigerating capacity required by the energy storage container and the plurality of different specified temperatures in the specified temperature set of the temperature control system.

In a possible implementation, before the determining, based on working time of the plurality of battery modules, working currents of the plurality of battery modules, internal resistances of the plurality of battery modules, and open circuit voltages of the plurality of battery modules, heat generated during working of the plurality of battery modules, the method further includes:

determining the working time of the plurality of battery modules and the working currents of the plurality of battery modules based on received running information.

In a possible implementation, before the determining the correspondence between total power consumption of a turned-on air conditioner and the plurality of different specified temperatures in the specified temperature set of the temperature control system based on the correspondence between a quantity of turned-on air conditioners and the plurality of different specified temperatures in the specified temperature set of the temperature control system and a correspondence between power consumption of one air conditioner and the plurality of different specified temperatures in the specified temperature set of the temperature control system, the method further includes:

pre-calibrating and storing a correspondence between power consumption, of one air conditioner, corresponding to different temperatures outside the energy storage container and the plurality of different specified temperatures in the specified temperature set of the temperature control system; and determining a correspondence between a refrigerating capacity, of one air conditioner, corresponding to a current temperature outside the energy storage container and the plurality of different specified temperatures in the specified temperature set of the temperature control system.

In a possible implementation, before the determining the correspondence between total power consumption of a turned-on air conditioner and the plurality of different specified temperatures in the specified temperature set of the temperature control system based on the correspondence between a quantity of turned-on air conditioners and the plurality of different specified temperatures in the specified temperature set of the temperature control system and a correspondence between power consumption of one air conditioner and the plurality of different specified temperatures in the specified temperature set of the temperature control system, the method further includes:

pre-calibrating and storing a correspondence between power consumption, of one air conditioner, corresponding to different temperatures outside the energy storage container and the plurality of different specified temperatures in the specified temperature set of the temperature control system; and determining a correspondence between power consumption, of one air conditioner, corresponding to a current temperature outside the energy storage container and the plurality of different specified temperatures in the specified temperature set of the temperature control system.

According to a third aspect, this application further provides a photovoltaic power generation system. The photovoltaic power generation system includes the energy storage system provided in the foregoing implementations, and further includes a photovoltaic inverter, an alternating current bus, and a plurality of photovoltaic components. The plurality of photovoltaic components are connected to an input end of the photovoltaic inverter, an output end of the photovoltaic inverter is connected to the alternating current bus, and the alternating current bus is connected to the energy storage system and an alternating current power grid. The photovoltaic component generates a direct current by using light energy and transmits the direct current to the photovoltaic inverter. The photovoltaic inverter converts the direct current into an alternating current, and then provides the alternating current for the alternating current power grid through the alternating current bus, and/or charges the energy storage system.

The energy storage system of the photovoltaic power generation system considers impact of a specified temperature of a temperature control system on an available capacity of a battery cluster when the battery cluster works at different specified temperatures of the temperature control system, and further considers impact of the specified temperature of the temperature control system on power consumption of the temperature control system. When a difference between the available capacity of the battery cluster and the power consumption of the temperature control system is maximum, it indicates that a ratio of the power consumption of the temperature control system to the available capacity of the battery cluster is minimum, and in this case, the energy storage system has the highest running efficiency. Therefore, a specified temperature, of the temperature control system, corresponding to the maximum difference between the available capacity of the battery cluster and the power consumption of the temperature control system is used as a target temperature, so that the temperature control system adjusts a temperature inside the energy storage container to the target temperature. In this way, running efficiency of the energy storage system can be improved, thereby improving running efficiency of the photovoltaic power generation system.

BRIEF DESCRIPTION OF THE DRAWINGS

FIG. 9 is a flowchart of a temperature control method for an energy storage system according to an embodiment of this application;

DETAILED DESCRIPTION OF THE EMBODIMENTS

To make a person skilled in the art better understand technical solutions provided in embodiments of this application, the following first describes an application scenario of the technical solutions provided in this application.

Figure 1:
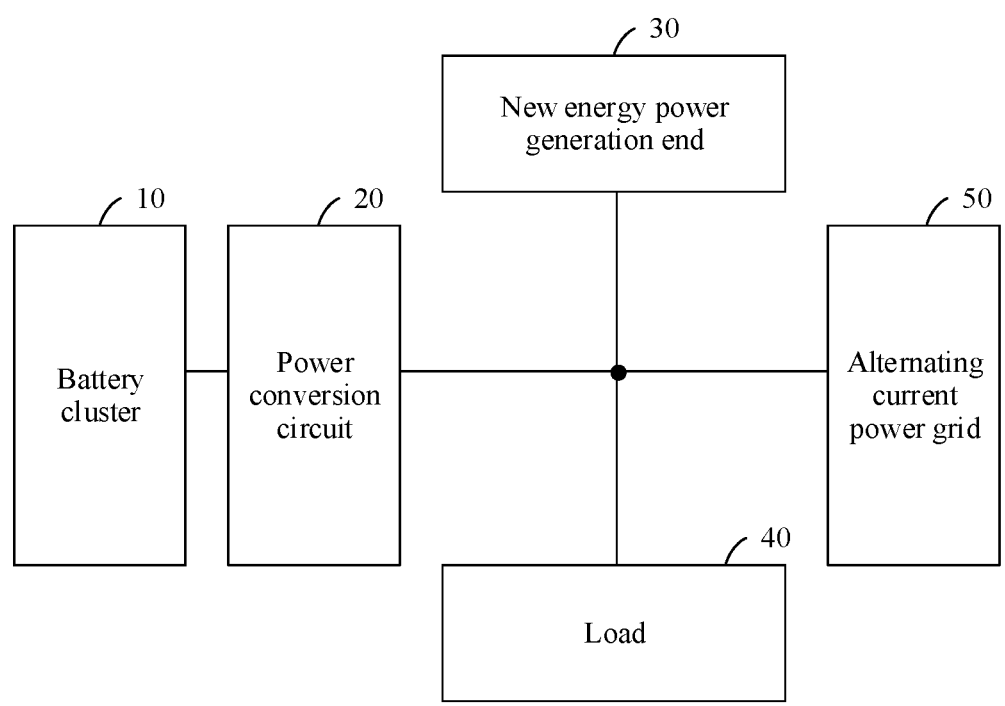
FIG. 1 is a schematic diagram of a new energy power generation system.

FIG. 1 is a schematic diagram of a new energy power generation system.

The new energy power generation system includes a battery cluster 10, a power conversion circuit 20, a new energy power generation end 30, and a load 40.

The new energy power generation end 30 is configured to generate an alternating current. Because the new energy power generation end 30 has features of fluctuation and uncertainty, an energy yield of the new energy power generation end 30 fluctuates. When the alternating current output by the new energy power generation end 30 is higher than a power consumption requirement of an alternating current power grid 50, excess electricity is converted into a direct current by using the power conversion circuit 20 to charge the battery cluster 10. When the alternating current output by the new energy power generation end 30 is lower than a power consumption requirement of an alternating current power grid 50, the power conversion circuit 20 converts, into an alternating current, a direct current output by the battery cluster 10, and then outputs the alternating current to the alternating current power grid 50, so that the alternating current power grid 50 tends to be stable.

For example, the new energy power generation end 30 is a photovoltaic power generation end. The new energy power generation end 30 includes a photovoltaic component and a direct current (DC)/alternating current (AC) conversion circuit (which may also be referred to as an inverter circuit or an inverter). The photovoltaic component generates a direct current by using light energy. The DC/AC conversion circuit converts the direct current into an alternating current, and then outputs the alternating current to the alternating current power grid 50 and/or charges the battery cluster 10 by using the power conversion circuit 20.

The load 40 is a power consumption device of the new energy power generation system, and the load 40 includes a temperature control system, and specifically includes an air conditioner and a fan. The load 40 may further include another device, for example, a lighting device. This is not specifically limited in this embodiment of this application.

The battery cluster 10 includes a plurality of battery modules connected in series, and each battery module includes a plurality of batteries connected in series or in parallel-series. The battery may be a lithium-ion battery, a lead-acid battery, a supercapacitor, or a combination of the foregoing types. This is not specifically limited in this application.

An energy storage system of the new energy power generation end 30 includes the battery cluster 10, the power conversion circuit 20, the temperature control system, and the like. The battery cluster 10 and the temperature control system are disposed inside an energy storage container.

A battery capacity refers to an amount of electricity that can be stored in the battery. With the use of the battery, the battery capacity attenuates. As a result, an actual available capacity of the battery is usually not equal to an initial value of the battery capacity. An important factor of battery capacity attenuation is a temperature of a working environment in which the battery is located.

In a current control solution of the temperature control system, a temperature of the energy storage container is controlled to an optimal working temperature of the battery cluster. At the optimal temperature, an amount of battery capacity attenuation is minimum, so that the available capacity of the battery cluster is maximum. However, in this manner, power consumption of the temperature control system is increased, and running efficiency of the energy storage system is further reduced.

To resolve the foregoing problem, this application provides an energy storage system, a temperature control method for the energy storage system, and a photovoltaic power generation system. Considering impact of a specified temperature of a temperature control system on an available capacity of a battery cluster and impact of the specified temperature of the temperature control system on power consumption of the temperature control system, a specified temperature, of the temperature control system, corresponding to a maximum difference between the available capacity of the battery cluster and the power consumption of the temperature control system is determined to be a target temperature, so that the temperature control system adjusts a temperature inside an energy storage container to the target temperature. In this way, running efficiency of the energy storage system can be improved.

The following describes the technical solutions of this application with reference to the accompanying drawings.

In the following descriptions of this application, terms such as "first" and "second" are used only for description purposes, and cannot be understood as indicating or implying relative importance or implicitly indicating a quantity of indicated technical features.

In this application, unless otherwise explicitly specified and limited, the term "connection" should be understood in a broad sense. For example, the "connection" may be a fixed connection, a detachable connection, an integral connection, a direct connection, or an indirect connection implemented through an intermediate medium.

Figure 2:
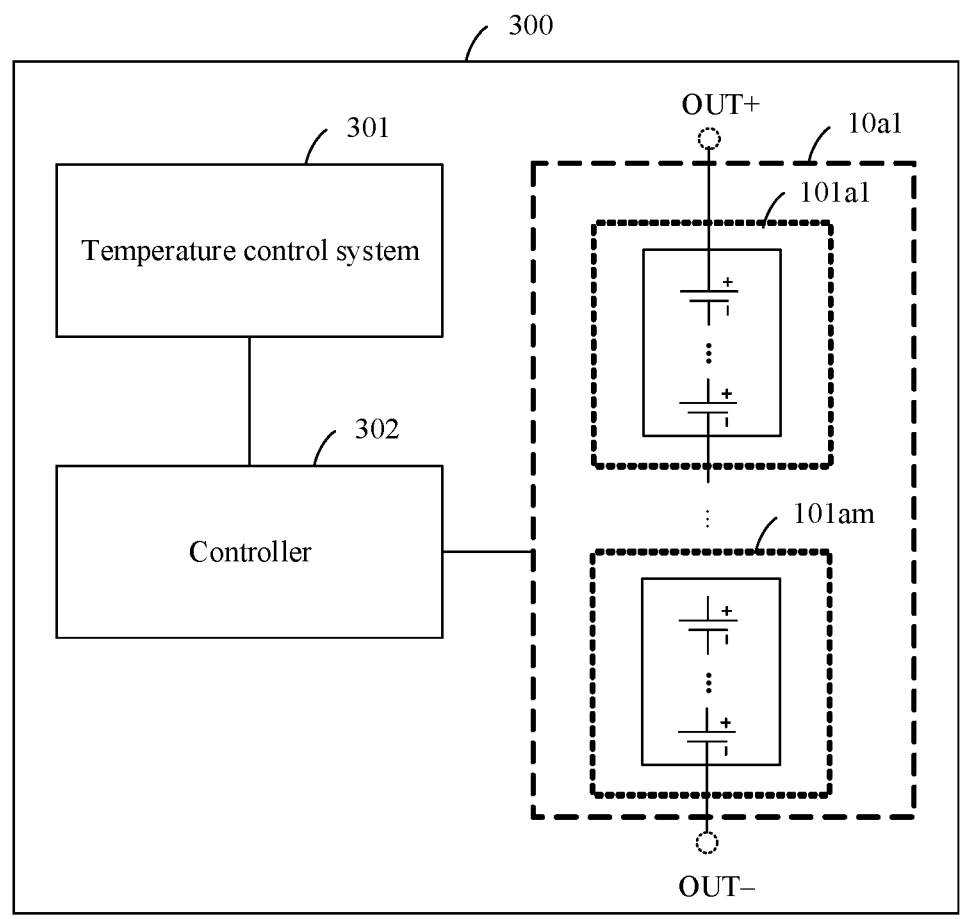
FIG. 2 is a schematic diagram of an energy storage system according to an embodiment of this application.

FIG. 2 is a schematic diagram of an energy storage system according to an embodiment of this application.

The energy storage system includes at least one energy storage container 300, and the energy storage container 300 includes a battery cluster 10a1, a temperature control system 301, and a controller 302.

The battery cluster 10a1 includes a plurality of battery modules connected in series. The battery cluster 10a1 shown in the FIGURE includes m battery modules, and the m battery modules are sequentially 10a1 to 10am.

Each battery module includes a plurality of batteries, and the batteries in the battery module may be connected in series or in parallel-series. This is not specifically limited in this embodiment of this application. In the FIGURE, an example in which the batteries are connected in series is used.

The temperature control system 301 is configured to adjust a temperature inside the energy storage container. After a specified temperature of the temperature control system is determined, the temperature control system 301 enables, by performing refrigerating or heating, the temperature inside the energy storage container to finally reach the specified temperature. Therefore, the specified temperature may be understood as a temperature expected to be reached inside the energy storage container, or may be understood as a temperature of a working environment in which the battery cluster is expected to be located.

In this solution of this embodiment of this application, impact of different specified temperatures of the temperature control system on an available capacity of the battery cluster and impact of different specified temperatures of the temperature control system on power consumption of the temperature control system are considered. The following separately provides descriptions.

The following first describes the impact of different specified temperatures of the temperature control system on the available capacity of the battery cluster. The available capacity of the battery cluster refers to a currently remaining capacity that is available for the battery cluster.

A capacity of the battery cluster is a sum of capacities of all batteries. A relationship between the available capacity of the battery cluster and the specified temperature of the temperature control system may be determined by analyzing a relationship between an available capacity of a battery and the specified temperature of the temperature control system.

Figure 3:
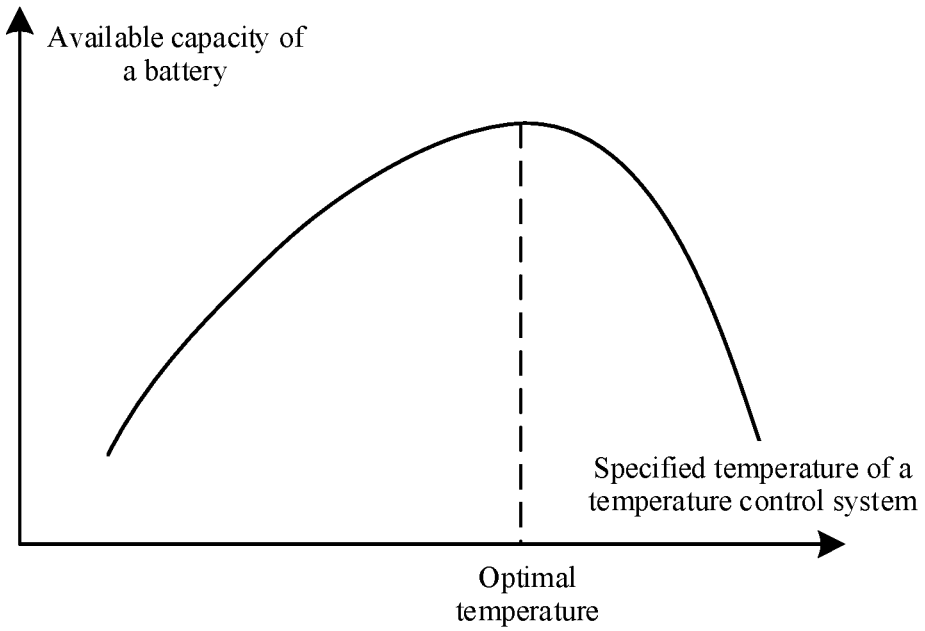
FIG. 3 is a schematic curve chart of a relationship between an available capacity of a battery and a specified temperature of a temperature control system according to an embodiment of this application.

FIG. 3 is a schematic curve chart of a relationship between an available capacity of a battery and a specified temperature of a temperature control system according to an embodiment of this application.

The specified temperature of the temperature control system is a temperature that the temperature control system is expected to control to finally reach inside an energy storage container, and also represents a temperature of a working environment of the battery. Therefore, FIG. 3 also represents a relationship between the available capacity of the battery and the temperature of the working environment of the battery.

It may be determined from FIG. 3 that the available capacity of the battery is related to the specified temperature of the temperature control system. When the battery works at an optimal temperature, an amount of battery capacity attenuation is minimum and the available capacity of the battery is maximum.

The following describes the impact of the specified temperature of the temperature control system on the power consumption of the temperature control system.

Figure 4:
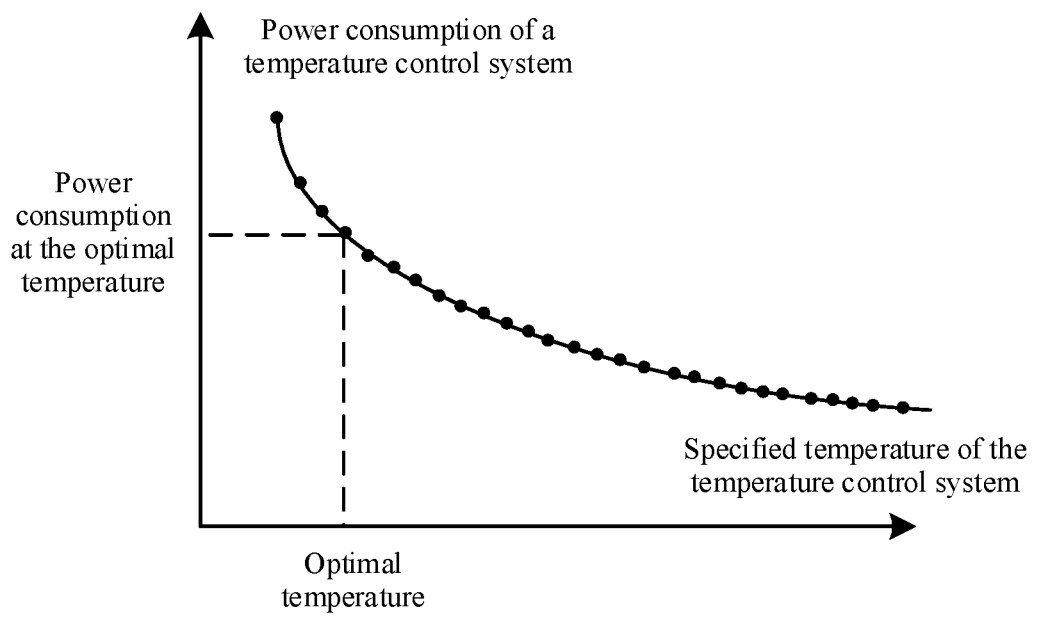
FIG. 4 is a diagram of a relationship between power consumption of a temperature control system during refrigerating and a specified temperature of the temperature control system according to an embodiment of this application.

FIG. 4 is a diagram of a relationship between power consumption of a temperature control system during refrigerating and a specified temperature of the temperature control system according to an embodiment of this application.

Data points in the FIGURE represent correspondences between different specified temperatures of the temperature control system and power consumption of the temperature control system when the temperature control system performs refrigerating. A range of the specified temperature should cover a normal working temperature range of a battery and also should fall within a temperature control capability range of the temperature control system. When values of the specified temperature are evenly set, a value interval of the specified temperature may be determined by temperature control precision of the temperature control system.

The foregoing data points are fitted into a relationship curve, which may indicate that when the temperature control system performs refrigerating, a lower specified temperature of the temperature control system, namely, a lower temperature that the temperature control system needs to adjust inside an energy storage container, indicates higher power consumption of the temperature control system. When the specified temperature of the temperature control system increases, the temperature control system adjusts the temperature inside the energy storage container to a relatively high temperature, and in this case, the power consumption of the temperature control system is reduced.

Figure 5:
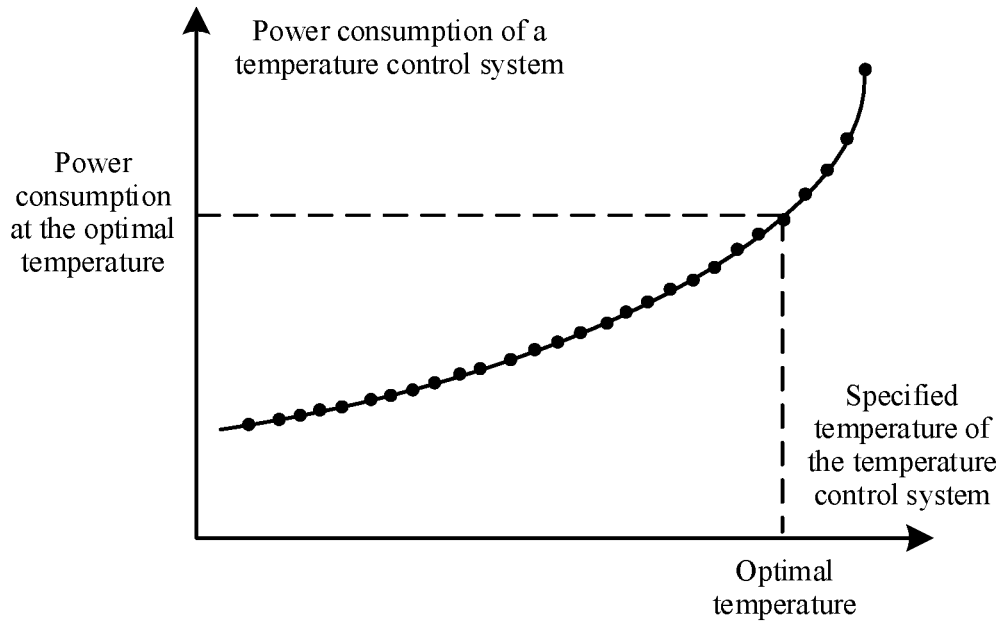
FIG. 5 is a diagram of a relationship between power consumption of a temperature control system during heating and a specified temperature of the temperature control system according to an embodiment of this application.

FIG. 5 is a diagram of a relationship between power consumption of a temperature control system during heating and a specified temperature of the temperature control system according to an embodiment of this application.

Data points in the FIGURE represent correspondences between different specified temperatures of the temperature control system and power consumption of the temperature control system when the temperature control system performs heating. A range of the specified temperature should cover a normal working temperature range of a battery and also should fall within a temperature control capability range of the temperature control system. When values of the specified temperature are evenly set, a value interval of the specified temperature may be determined by temperature control precision of the temperature control system.

The foregoing data points are fitted into a relationship curve, which may indicate that when the temperature control system performs heating, a lower specified temperature of the temperature control system, namely, a lower temperature that the temperature control system adjusts inside an energy storage container, indicates lower power consumption of the temperature control system. When the specified temperature of the temperature control system increases, the temperature control system adjusts the temperature inside the energy storage container to a relatively high temperature, and in this case, the power consumption of the temperature control system increases.

A controller 302 of an energy storage container in this application determines, based on a correspondence between an available capacity of a battery cluster and a plurality of different specified temperatures in a specified temperature set of a temperature control system and a correspondence between power consumption of the temperature control system and the plurality of different specified temperatures in the specified temperature set of the temperature control system, that a specified temperature, of the temperature control system, corresponding to a maximum difference between the available capacity of the battery cluster and the power consumption of the temperature control system is a target temperature, so that the temperature control system adjusts a temperature inside the energy storage container to the target temperature. The following describes a principle of this solution in detail.

First, an example in which the temperature control system performs refrigerating is used for description.

Figure 6:
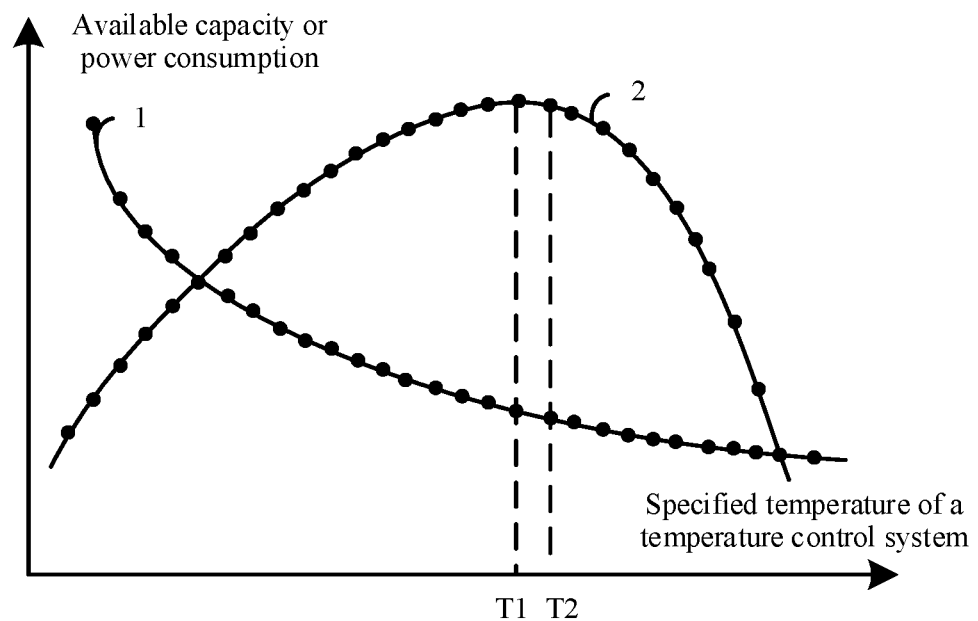
FIG. 6 is a schematic diagram 1 of a principle according to an embodiment of this application.

FIG. 6 is a schematic diagram 1 of a principle according to an embodiment of this application.

A specified temperature set of a temperature control system includes a plurality of different specified temperatures. A range, a quantity, and a temperature interval of the specified temperatures are not specifically limited in this embodiment of this application. In some embodiments, the range of the specified temperature covers a normal working temperature range of a battery, and the specified temperature also should fall within a temperature control capability range of the temperature control system. When values of the specified temperature are evenly set, the quantity of specified temperatures is related to the temperature interval. In this embodiment of this application, for setting the temperature interval, refer to temperature control precision of the temperature control system. For example, if the precision is 1° C., the temperature interval may be set to 1° C. For another example, if the precision is 0.1° C., the temperature interval is set to 0.1° C. or a multiple of 0.1° C.

A correspondence between an available capacity of a battery cluster and the plurality of different specified temperatures in the specified temperature set of the temperature control system may be pre-calibrated through experiment, and stored in a form of a data table.

The correspondence between an available capacity of a battery cluster and the plurality of different specified temperatures in the specified temperature set of the temperature control system is fitted into a curve, that is, a curve 2 in the FIGURE is obtained. Each data point on the curve 2 represents an available capacity, of the battery cluster, corresponding to a specified temperature. The curve 2 corresponds to the curve in FIG. 3.

A correspondence between power consumption of the temperature control system during refrigerating and the plurality of different specified temperatures in the specified temperature set of the temperature control system is fitted into a curve, that is, a curve 1 in the figure is obtained. Each data point on the curve 1 represents power consumption, of the temperature control system, corresponding to a specified temperature. The curve 1 corresponds to the curve in FIG. 4.

A difference between the curve 2 and the curve 1 is a difference between the available capacity of the battery cluster and the power consumption of the temperature control system. A maximum difference indicates a minimum ratio of the power consumption of the temperature control system to the available capacity of the battery cluster, and in this case, an energy storage system has the highest running efficiency.

In the FIGURE, a specified temperature, of the temperature control system, corresponding to the maximum difference is T2, that is, a target temperature is T2, and an optimal working temperature of the battery cluster is T1. When the temperature control system controls a temperature inside an energy storage container to be the target temperature T2, the available capacity of the battery cluster is usually not at the maximum value, and the specified temperature of the temperature control system can be increased to a specific extent by properly reducing the available capacity of the battery cluster. The increase of the specified temperature of the temperature control system can reduce the power consumption of the temperature control system during refrigerating. Therefore, the difference between the available capacity of the battery cluster and the power consumption of the temperature control system can reach the maximum value on the whole, to improve running efficiency of the energy storage system.

The following describes a principle in which the temperature control system performs heating.

Figure 7:
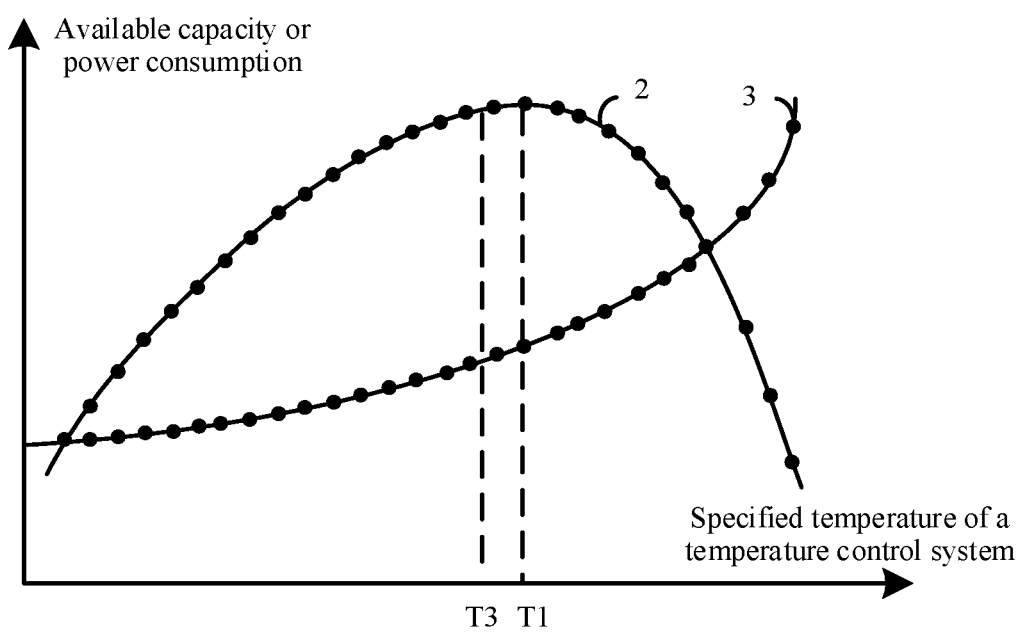
FIG. 7 is a schematic diagram 2 of a principle according to an embodiment of this application.

FIG. 7 is a schematic diagram 2 of a principle according to an embodiment of this application.

A correspondence between an available capacity of a battery cluster and a plurality of different specified temperatures in a specified temperature set of a temperature control system is fitted into a curve, that is, a curve 2 in the FIGURE is obtained. Each data point on the curve 2 represents an available capacity, of the battery cluster, corresponding to a specified temperature. The curve 2 corresponds to the curve in FIG. 3.

A correspondence between power consumption of the temperature control system during heating and the plurality of different specified temperatures in the specified temperature set of the temperature control system is fitted into a curve, that is, a curve 3 in the FIGURE is obtained. Each data point on the curve 3 represents power consumption, of the temperature control system, corresponding to a specified temperature. The curve 3 corresponds to the curve in FIG. 5.

A difference between the curve 2 and the curve 3 is a difference between the available capacity of the battery cluster and the power consumption.

A maximum difference indicates a minimum ratio of the power consumption of the temperature control system to the available capacity of the battery cluster, and in this case, an energy storage system has the highest running efficiency.

In the FIGURE, a specified temperature, of the temperature control system, corresponding to the maximum difference is T3, that is, a target temperature is T3, and an optimal working temperature of the battery cluster is T1. When the temperature control system controls a temperature inside an energy storage container to be the target temperature T3, the available capacity of the battery cluster is usually not at the maximum value, and the specified temperature of the temperature control system can be reduced to a specific extent by properly reducing the available capacity of the battery cluster. The reduction of the specified temperature of the temperature control system can reduce the power consumption of the temperature control system during heating. Therefore, the difference between the available capacity of the battery cluster and the power consumption of the temperature control system can reach the maximum value on the whole, to improve running efficiency of the energy storage system.

The controller 302 in the foregoing descriptions may be an application-specific integrated circuit (ASIC), a programmable logic device (PLD), a digital signal processor (DSP), or a combination thereof. The PLD may be a complex programmable logic device (CPLD), a field programmable logic gate array (FPGA), generic array logic (GAL), or any combination thereof. This is not specifically limited in this embodiment of this application.

In conclusion, the controller of the energy storage system provided in this embodiment of this application determines that the specified temperature, of the temperature control system, corresponding to the maximum difference between the available capacity of the battery cluster and the power consumption of the temperature control system is the target temperature, so that the temperature control system adjusts the temperature inside the energy storage container to the target temperature. In this way, energy consumption of the temperature control system can be reduced and running efficiency of the energy storage system can be improved.

The following describes the technical solutions of this application with reference to specific implementations.

A temperature control system of an energy storage container includes a plurality of air conditioners and a plurality of fans. Specific quantities of air conditioners and fans are not limited in this embodiment of this application. Power consumption of the temperature control system is a sum of power consumption of all turned-on air conditioners and all turned-on fans.

The air conditioner is configured to adjust a temperature inside the energy storage container through refrigerating or heating, in other words, adjust a working environment temperature of a battery cluster. During actual application, to achieve evenness of a container temperature, the air conditioners are usually evenly distributed inside the energy storage container.

The fans are configured to adjust gas flow speeds around a plurality of battery modules. Therefore, the fans may be disposed near the battery modules.

The following describes a process in which a controller determines a correspondence between the power consumption of the temperature control system and a plurality of different specified temperatures in a specified temperature set of the temperature control system.

The following first describes an implementation in which the controller determines power consumption of a turned-on fan.

An amount of the power consumption of the turned-on fan is mainly determined by a quantity of turned-on fans and rotational speeds of the turned-on fans.

The rotate speed of the fan is determined by a temperature of the battery module. When the air conditioner performs refrigerating, a higher temperature of the battery module indicates a higher rotate speed of the fan, and a lower temperature of the battery module indicates a lower rotate speed of the fan. When the air conditioner performs heating, a lower temperature of the battery module indicates a higher rotate speed of the fan, and a higher temperature of the battery module indicates a lower rotate speed of the fan. A relationship between the rotate speed of the fan and the temperature of the battery module may be preset.

A relationship between a rotate speed of one fan and power consumption of the fan is pre-determined and stored. In some embodiments, the relationship between a rotate speed of one fan and power consumption of the fan is stored in a form of a data table.

In some embodiments, the quantity of fans is the same as a quantity of battery modules, and each fan is configured to adjust a gas flow speed around one corresponding battery module. To ensure evenness of temperatures of all of the battery modules, all of the fans are usually set to be turned on. The controller determines the rotate speed of the fan based on the temperature of the battery module. After determining a rotate speed of one fan, the controller may determine power consumption $Q_a$ of the fan at the rotate speed based on the relationship between a rotate speed of one fan and power consumption of the fan. The controller determines, based on a quantity $n_1$ of turned-on fans and the power consumption $Q_a$ of one fan, total power consumption $Q_{fan}$ of the turned-on fans by using the following formula:

$$Q_{fan}=n_1*Q_a \quad (1).$$

Because all of the fans are turned on in this case, a value of $n_1$ in formula (1) is a total quantity of fans.

In some other embodiments, to reduce power consumption of the fans, only some fans may be turned on. In this case, the quantity of turned-on fans is determined by the temperature of the battery module. When the air conditioner performs refrigerating, a higher temperature of the battery module indicates more turned-on fans, and a lower temperature of the battery module indicates fewer turned-on fans. When the air conditioner performs heating, a lower temperature of the battery module indicates more turned-on fans, and a higher temperature of the battery module indicates fewer turned-on fans. A relationship between the quantity of turned-on fans and the temperature of the battery module may be preset.

The controller determines the quantity of turned-on fans based on the temperature of the battery module, and determines a rotate speed of one fan based on the temperature of the battery module. After determining the rotate speed of one fan, the controller may determine power consumption $Q_a$ of the fan at the rotate speed based on the relationship between a rotate speed of one fan and power consumption of the fan. The controller determines, based on a quantity $n_1$ of turned-on fans and the power consumption $Q_a$ of one fan, total power consumption $Q_{fan}$ of the turned-on fans by using formula (1). In this case, a value of $n_1$ in formula (1) is the quantity of turned-on fans.

The following describes a process in which the controller determines a correspondence between total power consumption of a turned-on air conditioner and the plurality of different specified temperatures in the specified temperature set of the temperature control system.

The following first uses an example in which the air conditioner performs refrigerating for description. A principle used when the air conditioner performs heating is similar to the following description. Details are not described in this embodiment of this application.

The controller first determines a correspondence between a total refrigerating capacity (refrigerating capacity) $Q_{refrigerating}$ currently required by the energy storage container for refrigerating and the plurality of different specified temperatures in the specified temperature set of the temperature control system. The refrigerating capacity refers to a sum of heat that is removed from confined space in a unit time when the air conditioner performs refrigerating.

The total refrigerating capacity $Q_{refrigerating}$ mainly includes heat Q1 transferred from solar heat radiation to the inside of the energy storage container, heat Q2 transferred from the outside of the energy storage container to the inside of the energy storage container through heat conduction, and heat Q3 generated during working of the plurality of battery modules.

For ease of description, the following uses an example in which the temperature control system starts to adjust the temperature inside the energy storage container from a moment t1, the battery module in the energy storage container is in a silent state (not charged or discharged) from the moment t1 to a moment t2, and the battery module in the energy storage container works (is charged or discharged) from the moment t2 to a moment t3.

The energy Q1 of solar heat radiation may be determined by using the following formula:

$$Q1 = \int_{t1}^{t3} 0.047 * a * S * F dt \qquad (2).$$

In formula (2), a is a solar radiation coefficient, S is solar radiation (Solar radiation) intensity, and F is an outer surface area of the energy storage container.

The heat Q2 transferred from the outside of the energy storage container to the inside of the energy storage container through heat conduction may be determined by using the following formula:

$$Q2 = \int_{t1}^{t3} K * F * (T_{outside} - T_{specified\ temperature}) dt \qquad (3).$$

In formula (3), K is a heat transfer coefficient of the energy storage container, F is the outer surface area of the energy storage container, $T_{outside}$ is a current temperature outside the energy storage container, and $T_{specified\ temperature}$ is a specified temperature of the temperature control system. Therefore, different corresponding Q2 may be determined based on different specified temperatures in the specified temperature set. That is, formula (3) represents a correspondence between the heat Q2 transferred from the outside of the energy storage container to the inside of the energy storage container through heat conduction and the plurality of different specified temperatures in the specified temperature set of the temperature control system.

The heat Q3 generated during working of the plurality of battery modules may be determined by using the following formula:

$$Q3 = m * \int_{t2}^{t3} \left(I^2 * R - I * t * dOCV_1/dt\right) dt. \qquad (4)$$

A quantity of battery modules included in the battery cluster is m, a working current of the battery module is I, an internal resistance of the battery module is R, and an open circuit voltage (open circuit voltage, OCV) of the battery module is $OCV_1$.

The internal resistance R of the battery module may be pre-calibrated through a test and stored. For example, an internal resistance of one battery is pre-calibrated through a battery aging cycle experiment, and then the internal resistance of the battery module is calibrated based on the internal resistance of the battery.

The open circuit voltage $OCV_1$ of the battery module may be pre-calibrated through a test and stored.

In some embodiments, the controller may receive running information sent by an upper computer, and determine working time of the plurality of battery modules based on the running information, that is, determine the foregoing moment t2 and moment t3, and determine the working currents I of the plurality of battery modules.

According to the foregoing formulas (1) to (3), the correspondence between a total refrigerating capacity $Q_{refrigerating}$ currently required by the energy storage container and the plurality of different specified temperatures in the specified temperature set of the temperature control system is determined. For details, refer to the following formula:

$$Q_{refrigerating} = Q1 + Q2 + Q3 \qquad (5).$$

Then, the controller determines a correspondence between a refrigerating capacity of one air conditioner and the plurality of different specified temperatures in the specified temperature set of the temperature control system. The refrigerating capacity of one air conditioner is related to a temperature outside the energy storage container and the specified temperature of the temperature control system. In this solution of this embodiment of this application, a correspondence between refrigerating capacities, of one air conditioner, corresponding to different temperatures outside the energy storage container and the plurality of different specified temperatures in the specified temperature set of the temperature control system is pre-calibrated and stored.

A range of the temperature outside the energy storage container and a value of the temperature interval are not specifically limited in this embodiment of this application. In some embodiments, the range of the temperature outside the energy storage container should cover a change range of an environment temperature of a location in which the energy storage container is disposed. For the value of the temperature interval, refer to temperature control precision of the temperature control system. For example, if the precision is 1° C., the temperature interval may be set to 1° C. For another example, if the precision is 0.1° C., the temperature interval is set to 0.1° C. or a multiple of 0.1° C.

The controller determines, based on the current temperature $T_{outside}$ outside the energy storage container, a correspondence between a refrigerating capacity $Q_0$ of one air conditioner, corresponding to the temperature $T_{outside}$ and the plurality of different specified temperatures in the specified temperature set of the temperature control system.

In some embodiments, an energy storage system further includes a first temperature sensor, and the first temperature sensor is disposed outside the energy storage container. The first temperature sensor is configured to: detect the temperature outside the energy storage container, and send a detection result to the controller.

The controller determines a correspondence between a quantity $n_2$ of turned-on air conditioners and the plurality of different specified temperatures in the specified temperature set of the temperature control system based on the correspondence between a total refrigerating capacity $Q_{refrigerating}$ and the plurality of different specified temperatures in the specified temperature set of the temperature control system and the correspondence between a refrigerating capacity $Q_0$ of one air conditioner and the plurality of different specified temperatures in the specified temperature set of the temperature control system, where $n_2$ is a positive integer, and may be determined by using the following formula:

$$n_2 = \lceil Q_{refrigerating}/Q_0 \rceil. \quad (6)$$

To be specific, $n_2$ is a result obtained by rounding up a quotient obtained by dividing $Q_{refrigerating}$ by $Q_0$. Rounding up is to ensure that enough air conditioners are turned on. Then, the controller determines a correspondence between power consumption of one air conditioner and the plurality of different specified temperatures in the specified temperature set of the temperature control system.

Specifically, power consumption of one air conditioner is related to the temperature outside the energy storage container and the specified temperature of the temperature control system. In this solution of this embodiment of this application, a correspondence between power consumption, of one air conditioner, corresponding to different temperatures outside the energy storage container and the plurality of different specified temperatures in the specified temperature set of the temperature control system is pre-calibrated and stored.

A range of the temperature outside the energy storage container and a value of the temperature interval are not specifically limited in this embodiment of this application. In some embodiments, the range of the temperature outside the energy storage container should cover a change range of an environment temperature of a location in which the energy storage container is disposed. For the value of the temperature interval, refer to temperature control precision of the temperature control system. For example, if the precision is 1° C., the temperature interval may be set to 1° C. For another example, if the precision is 0.1° C., the temperature interval is set to 0.1° C. or a multiple of 0.1° C.

The controller determines, based on the current temperature $T_{outside}$ outside the energy storage container, a correspondence between power consumption $Q_b$ of one air conditioner, corresponding to the temperature $T_{outside}$ and the plurality of different specified temperatures in the specified temperature set of the temperature control system.

Then, the controller determines a correspondence between total power consumption $Q_{air\ conditioner}$ of a turned-on air conditioner and the plurality of different specified temperatures in the specified temperature set of the temperature control system based on the correspondence between a quantity $n_2$ of turned-on air conditioners and the plurality of different specified temperatures in the specified temperature set of the temperature control system and the correspondence between power consumption $Q_b$ of one air conditioner and the plurality of different specified temperatures in the specified temperature set of the temperature control system. For details, refer to the following formula:

$$Q_{air\ conditioner}=n_2*Q_b \quad (7)$$

The total power consumption $Q_{fan}$ of the turned-on fan and the total power consumption $Q_{air\ conditioner}$ of the turned-on air conditioner are added to obtain total power conditioner of consumption $Q_{system}$ of the temperature control system. For details, refer to the following formula:

$$Q_{system}=Q_{fan}+Q_{air\ conditioner} \quad (8)$$

Formula (7) represents a correspondence between the power consumption of the temperature control system and the plurality of different specified temperatures in the specified temperature set of the temperature control system, and corresponds to the curve shown in FIG. 4.

To implement real-time measurement of the temperatures inside and outside the energy storage container, the energy storage system further includes a first temperature sensor and a second temperature sensor. The first temperature sensor is disposed inside the energy storage container, and is configured to: detect the temperature inside the energy storage container, and send a detection result to the controller. The second temperature sensor is disposed outside the energy storage container, and is configured to: detect the environment temperature outside the energy storage container, and send a detection result to the controller.

It may be understood that, because the air conditioner is used for refrigerating in the temperature control system, during actual application, the specified temperature of the temperature control system is also a specified temperature of the air conditioner.

According to the foregoing descriptions, the correspondence between the power consumption of the temperature control system and the plurality of different specified temperatures in the specified temperature set of the temperature control system when the air conditioner performs refrigerating is determined. When the air conditioner performs heating, a principle is similar, and a determined correspondence corresponds to the curve shown in FIG. 5. Details are not described herein in this embodiment of this application.

The following describes a manner in which the controller determines a correspondence between an available capacity of the battery cluster in a current working state and the plurality of different specified temperatures in the specified temperature set of the temperature control system.

According to this solution of this embodiment of this application, a correspondence between available capacities of the battery cluster in different working states and the plurality of different specified temperatures in the specified temperature set of the temperature control system is pre-calibrated and stored. Then, the controller determines, based on the current working state of the battery cluster, a correspondence between a corresponding available capacity of the battery cluster and the plurality of different specified temperatures in the specified temperature set of the temperature control system. Details are described below.

The battery cluster of the energy storage system may work in a charging state, a discharging state, and a silent state (namely, neither charging nor discharging). Further, when the battery cluster is in the charging state, the battery cluster can be charged at different charging rates; when the battery cluster is in the discharging state, the battery cluster can be discharged at different discharging rates; when the battery cluster is in the silent state, the battery cluster may be in different states of charge (SOC).

The charging rate is a measure of a charging speed, and the discharging rate is a measure of a discharging speed. A larger rate indicates a larger charging current or discharging current of the battery cluster and shorter duration for completing charging and discharging of the battery cluster.

The SOC is a ratio of remaining electricity of the battery cluster to a current available capacity of the battery cluster, and is usually represented by a percentage. Therefore, a value range of the SOC is [0, 1].

In this solution provided in this embodiment of this application, when the battery cluster is charged, a correspondence between available capacities, of the battery cluster, corresponding to different charging rates and the plurality of different specified temperatures in the specified temperature set of the temperature control system may be pre-calibrated. When the battery cluster is discharged, a correspondence between available capacities, of the battery cluster, corresponding to different discharging rates and the plurality of different specified temperatures in the specified temperature set of the temperature control system may be pre-calibrated. When the battery cluster is in the silent state, a correspondence between available capacities, of the battery cluster, corresponding to different states of charge and the plurality of different specified temperatures in the specified temperature set of the temperature control system may be pre-calibrated.

Values of the charging rate and the discharging rate are determined by a configuration of the energy storage system. This is not specifically limited in this embodiment of this application. The value range of the SOC is [0, 1]. A specific value interval of the SOC is not limited in this embodiment of this application.

When determining that the battery cluster is in the charging state, the controller further determines a correspondence between an available capacity of the battery cluster at a current charging rate and the plurality of different specified temperatures in the specified temperature set of the temperature control system. When determining that the battery cluster is in the discharging state, the controller further determines a correspondence between an available capacity of the battery cluster at a current discharging rate and the plurality of different specified temperatures in the specified temperature set of the temperature control system. When determining that the battery cluster is in the silent state, the controller further determines a correspondence between an available capacity of the battery cluster in a current state of charge and the plurality of different specified temperatures in the specified temperature set of the temperature control system.

The foregoing correspondence is stored in a memory. The memory includes but is not limited to a phase change memory (PRAM), a static random access memory (SRAM), a dynamic random access memory (DRAM), and another type of random access memory (RAM), or may be an electrically erasable programmable read-only memory (EE-PROM).

The controller in the foregoing descriptions in this embodiment of this application may be a first-level controller or a combination of multilevel controllers. When the controller is a multilevel controller, an upper-level controller may control a lower-level controller. The controller may be independently integrated on a printed circuit board (PCB), or may be physically divided into a plurality of parts and respectively disposed on PCBs in different locations of the energy storage system, and the parts cooperate to implement a control function. The following describes in detail an implementation when the controller is a multilevel controller.

Figure 8:
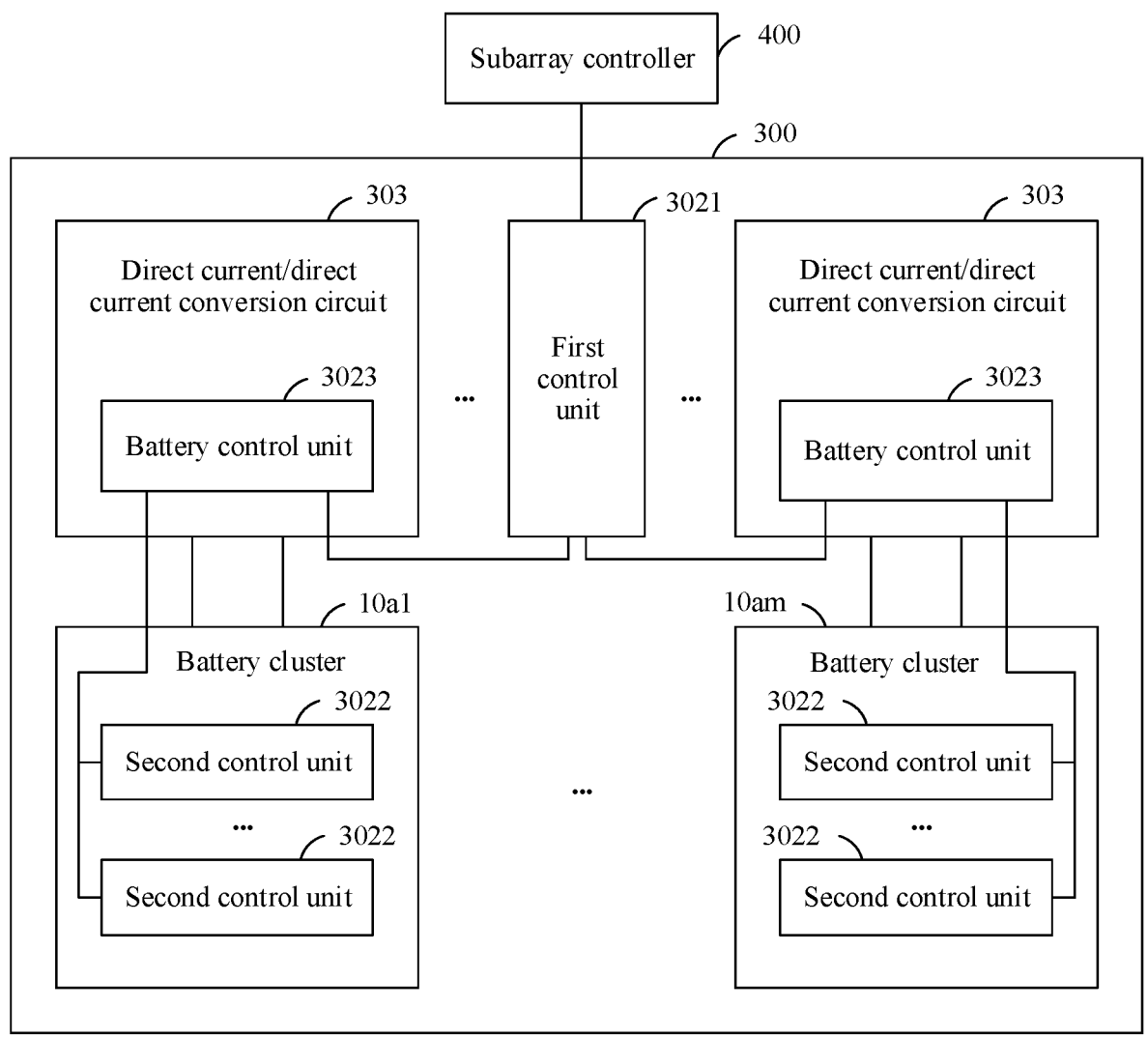
FIG. 8 is a schematic diagram of another energy storage system according to an embodiment of this application.

FIG. 8 is a schematic diagram of another energy storage system according to an embodiment of this application.

The energy storage system usually includes a plurality of energy storage containers 300, and only one of the energy storage containers 300 is shown in the FIGURE.

A controller of the energy storage system includes a first control unit 3021, a second control unit 3022, and a battery control unit (BCU) 3023.

A quantity of second control units 3022 is the same as a quantity of fans, and each second control unit 3022 is configured to control a working state of one corresponding fan. In some embodiments, the second control unit 3022 is a battery monitoring unit (BMU). Each second control unit 3022 is configured to monitor a working state of one corresponding battery module, for example, detect a temperature and an SOC of the corresponding battery module. The second control unit 3022 is further configured to send a detection result of the temperature, the SOC, and the like to the first control unit 3021.

The first control unit 3021 is configured to control working states of a plurality of air conditioners. In some embodiments, the first control unit 3021 is a container monitoring unit (CMU).

The first control unit 3021 and the second control unit 3022 communicate with each other by using the battery control unit 3023. To be specific, the first control unit 3021 sends control information to each second control unit 3022 by using each battery control unit 3023, so that the second control unit 3022 controls a corresponding fan based on the control information.

The energy storage container 300 includes battery clusters $10a1$ to $10am$, and each battery cluster is correspondingly connected to one direct current (DC)/direct current conversion circuit 303. The direct current/direct current conversion circuit 303 is configured to: perform direct current conversion on a direct current output by the battery cluster, and then output the direct current to the outside of the energy storage container; or perform direct current conversion on a direct current obtained from the outside of the energy storage container, and then charge the battery cluster. The battery control unit 3023 may be integrated with the direct current/direct current conversion circuit 303, and is configured to control a working state of the corresponding direct current/direct current conversion circuit 303.

A subarray controller 400 of the energy storage system is configured to control a working state of each energy storage container 300, and the subarray controller 400 may exchange information with the first control unit 3021. In some embodiments, the subarray controller 400 is a smart array control unit (SACU).

The first control unit 3021 may obtain running information sent by the subarray controller 400, and determine, based on the running information, duration from this time to time of next charging or discharging of a battery and a working current of the battery, to determine energy consumption of a temperature control system.

In conclusion, according to the energy storage system provided in this embodiment of this application, impact of a specified temperature of the temperature control system on an available capacity of the battery cluster when the battery cluster works at different specified temperatures of the temperature control system is considered, and impact of the specified temperature of the temperature control system on power consumption of the temperature control system is further considered. A specified temperature, of the temperature control system, corresponding to a maximum difference between the available capacity of the battery cluster and the power consumption of the temperature control system is used as a target temperature, so that the temperature control system adjusts a temperature inside the energy storage container to the target temperature. In this case, a ratio of the power consumption of the temperature control system to the available capacity of the battery cluster is minimum, thereby improving running efficiency of the energy storage system.

Based on the energy storage system provided in the foregoing embodiments, an embodiment of this application further provides a temperature control method for an energy storage system. The following provides detailed descriptions with reference to the accompanying drawings.

FIG. 9 is a flowchart of a temperature control method for an energy storage system according to an embodiment of this application.

For a specific implementation of the energy storage system, refer to the related descriptions in the foregoing embodiment. Details are not described herein again in this embodiment of this application. The method includes the following steps.

S501: Determine, based on a correspondence between an available capacity of a battery cluster and a plurality of different specified temperatures in a specified temperature set of a temperature control system and a correspondence between power consumption of the temperature control system and the plurality of different specified temperatures in the specified temperature set of the temperature control system, that a specified temperature, of the temperature control system, corresponding to a maximum difference between the available capacity of the battery cluster and the power consumption of the temperature control system is a target temperature.

S502: Adjust a temperature inside an energy storage container to the target temperature.

According to the method provided in this embodiment of this application, impact of the specified temperature of the temperature control system on the available capacity of the battery cluster when the battery cluster works at different specified temperatures of the temperature control system is considered, and impact of the specified temperature of the temperature control system on the power consumption of the temperature control system is further considered. When the difference between the available capacity of the battery cluster and the power consumption of the temperature control system is maximum, it indicates that a ratio of the power consumption of the temperature control system to the available capacity of the battery cluster is minimum, and in this case, the energy storage system has the highest running efficiency. Therefore, the specified temperature, of the temperature control system, corresponding to the maximum difference between the available capacity of the battery cluster and the power consumption of the temperature control system is used as the target temperature, so that the temperature control system adjusts the temperature inside the energy storage container to the target temperature. In this way, running efficiency of the energy storage system can be improved.

The following first describes in detail a method for determining a correspondence between an available capacity of the battery cluster in a current state and the plurality of different specified temperatures in the specified temperature set of the temperature control system.

Figure 10:
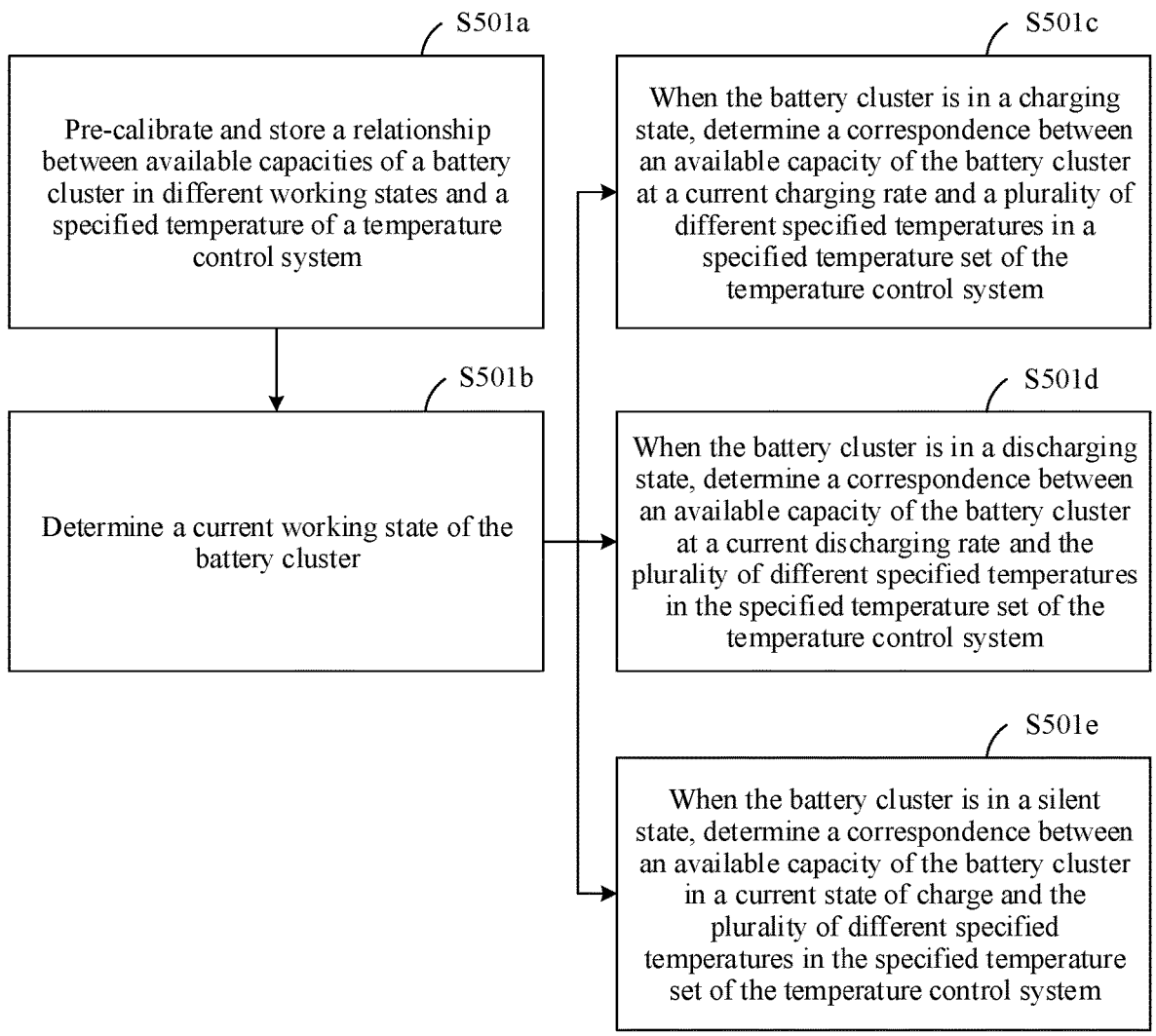
FIG. 10 is a flowchart of another temperature control method for an energy storage system according to an embodiment of this application.

FIG. 10 is a flowchart of another temperature control method for an energy storage system according to an embodiment of this application.

The method includes the following steps.

S501a: Pre-calibrate and store a relationship between available capacities of a battery cluster in different working states and a specified temperature of a temperature control system.

According to the method provided in this embodiment of this application, when the battery cluster is charged, a correspondence between available capacities, of the battery cluster, corresponding to different charging rates and a plurality of different specified temperatures in a specified temperature set of the temperature control system may be pre-calibrated. When the battery cluster is discharged, a correspondence between available capacities, of the battery cluster, corresponding to different discharging rates and the plurality of different specified temperatures in the specified temperature set of the temperature control system may be pre-calibrated. When the battery cluster is in a silent state, a correspondence between available capacities, of the battery cluster, corresponding to different states of charge and the plurality of different specified temperatures in the specified temperature set of the temperature control system may be pre-calibrated.

Values of the charging rate and the discharging rate are determined by a configuration of the energy storage system. This is not specifically limited in this embodiment of this application. A value range of the SOC is [0, 1]. A specific value interval of the SOC is not limited in this embodiment of this application.

S501b: Determine a current working state of the battery cluster.

S501c: When the battery cluster is in a charging state, determine a correspondence between an available capacity of the battery cluster at a current charging rate and the plurality of different specified temperatures in the specified temperature set of the temperature control system.

S501d: When the battery cluster is in a discharging state, determine a correspondence between an available capacity of the battery cluster at a current discharging rate and the plurality of different specified temperatures in the specified temperature set of the temperature control system.

S501e: When the battery cluster is in a silent state, determine a correspondence between an available capacity of the battery cluster in a current state of charge and the plurality of different specified temperatures in the specified temperature set of the temperature control system. The following describes a method for determining current energy consumption of the temperature control system.

Figure 11:
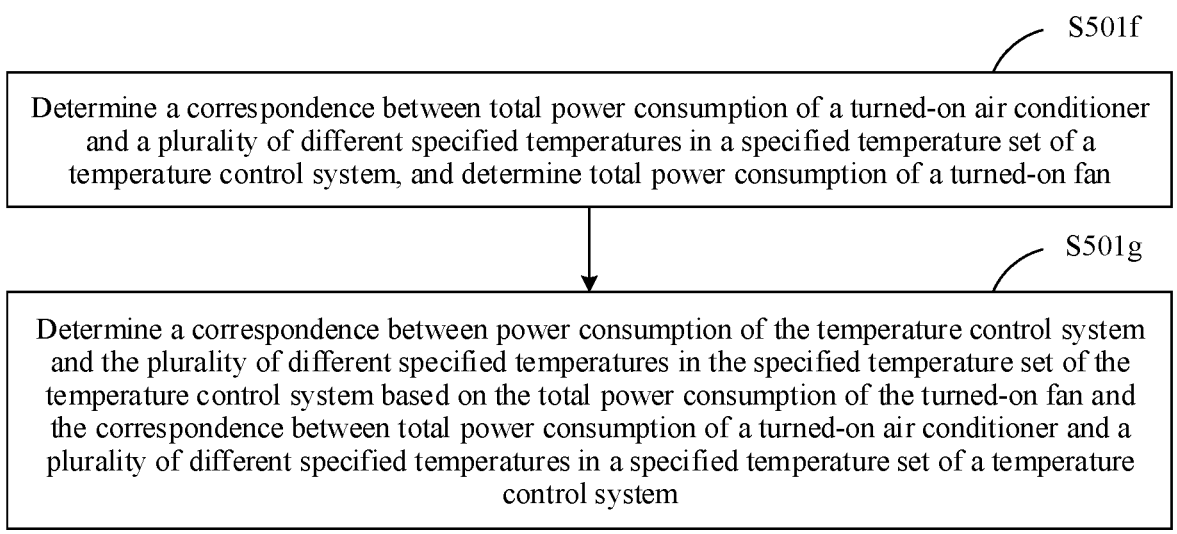
FIG. 11 is a flowchart of a method for determining a correspondence between power consumption of a temperature control system and a plurality of different specified temperatures in a specified temperature set of the temperature control system according to an embodiment of this application.

FIG. 11 is a flowchart of a method for determining a correspondence between power consumption of a temperature control system and a plurality of different specified temperatures in a specified temperature set of the temperature control system according to an embodiment of this application.

The temperature control system includes a plurality of air conditioners and a plurality of fans. The fan is configured to adjust a gas flow speed around a battery module, and the air conditioner is configured to adjust a temperature inside an energy storage container. The method includes the following steps.

S501f: Determine a correspondence between total power consumption of a turned-on air conditioner and the plurality of different specified temperatures in the specified temperature set of the temperature control system, and determine total power consumption of a turned-on fan.

The following describes a method for determining the correspondence between total power consumption of a turned-on air conditioner and the plurality of different specified temperatures in the specified temperature set of the temperature control system.

First, an example in which the air conditioner performs refrigerating is used for description. A principle used when the air conditioner performs heating is similar to the following description. Details are not described in this embodiment.

First, a correspondence between a total refrigerating capacity currently required by the energy storage container and the plurality of different specified temperatures in the specified temperature set of the temperature control system is determined.

The total refrigerating capacity mainly includes heat transferred from solar heat radiation to the inside of the energy storage container, heat transferred from the outside of the energy storage container to the inside of the energy storage container through heat conduction, and heat generated during working of a plurality of battery modules.

The heat transferred by solar heat radiation to the inside of the energy storage container is determined based on solar radiation intensity and an outer surface area of the energy storage container. A correspondence between heat transferred from the outside of the energy storage container to the inside of the energy storage container through heat conduction and the plurality of different specified temperatures in the specified temperature set of the temperature control system is determined based on a heat transfer coefficient of the energy storage container, the outer surface area of the energy storage container, and a current temperature outside the energy storage container. Heat generated during working of the plurality of battery modules is determined based on working time of the plurality of battery modules, working currents of the plurality of battery modules, internal resistances of the plurality of battery modules, and open circuit voltages of the plurality of battery modules.

The correspondence between a total refrigerating capacity required by the energy storage container and the plurality of different specified temperatures in the specified temperature set of the temperature control system is determined based on the heat transferred by solar heat radiation to the inside of the energy storage container, the correspondence between heat transferred from the outside of the energy storage container to the inside of the energy storage container through heat conduction and the plurality of different specified temperatures in the specified temperature set of the temperature control system, and the heat generated during working of the plurality of battery modules.

In some embodiments, the working time of the plurality of battery modules and the working currents of the plurality of battery modules may be obtained from running information sent by an upper computer. The internal resistance of the battery module may be pre-calibrated through a test and stored. For example, an internal resistance of one battery is pre-calibrated through a battery aging cycle experiment, and then the internal resistance of the battery module is calibrated based on the internal resistance of the battery. Similarly, the open circuit voltage of the battery module may be pre-calibrated through a test and stored.

Then, a correspondence between a refrigerating capacity of one air conditioner and the plurality of different specified temperatures in the specified temperature set of the temperature control system is determined. A refrigerating capacity of one air conditioner is related to a temperature outside the energy storage container and the specified temperature of the temperature control system. In this solution of this embodiment of this application, a correspondence between refrigerating capacities, of one air conditioner, corresponding to different temperatures outside the energy storage container and the plurality of different specified temperatures in the specified temperature set of the temperature control system is pre-calibrated and stored.

A range of the temperature outside the energy storage container and a value of a temperature interval are not specifically limited in this embodiment of this application. In some embodiments, the range of the temperature outside the energy storage container should cover a change range of an environment temperature of a location in which the energy storage container is disposed. For the value of the temperature interval, refer to temperature control precision of the temperature control system. For example, if the precision is 1° C., the temperature interval may be set to 1° C. For another example, if the precision is 0.1° C., the temperature interval is set to 0.1° C. or a multiple of 0.1° C.

A correspondence between a refrigerating capacity, of one air conditioner, corresponding to a current temperature outside the energy storage container and the plurality of different specified temperatures in the specified temperature set of the temperature control system is determined.

A controller determines a correspondence between a quantity of turned-on air conditioners and the plurality of different specified temperatures in the specified temperature set of the temperature control system based on the correspondence between a total refrigerating capacity and the plurality of different specified temperatures in the specified temperature set of the temperature control system and the correspondence between a refrigerating capacity of one air conditioner and the plurality of different specified temperatures in the specified temperature set of the temperature control system.

Rounding up the quantity of turned-on air conditioners is to ensure that enough air conditioners are turned on. Then, a correspondence between power consumption of one air conditioner and the plurality of different specified temperatures in the specified temperature set of the temperature control system is determined.

Specifically, power consumption of one air conditioner is related to a temperature outside the energy storage container and the specified temperature of the temperature control system. In this solution of this embodiment of this application, a correspondence between power consumption, of one air conditioner, corresponding to different temperatures outside the energy storage container and the plurality of different specified temperatures in the specified temperature set of the temperature control system is pre-calibrated and stored.

A range of the temperature outside the energy storage container and a value of a temperature interval are not specifically limited in this embodiment of this application. In some embodiments, the range of the temperature outside the energy storage container should cover a change range of an environment temperature of a location in which the energy storage container is disposed. For the value of the temperature interval, refer to temperature control precision of the temperature control system. For example, if the precision is 1° C., the temperature interval may be set to 1° C. For another example, if the precision is 0.1° C., the temperature interval is set to 0.1° C. or a multiple of 0.1° C.

Then, a correspondence between power consumption $Q_b$, of one air conditioner, corresponding to a current temperature outside the energy storage container and the plurality of different specified temperatures in the specified temperature set of the temperature control system is determined.

A correspondence between total power consumption of a turned-on air conditioner and the plurality of different specified temperatures in the specified temperature set of the temperature control system is determined based on the correspondence between a quantity of turned-on air conditioners and the plurality of different specified temperatures in the specified temperature set of the temperature control system and the correspondence between power consumption of one air conditioner and the plurality of different specified temperatures in the specified temperature set of the temperature control system that are obtained in the foregoing process.

The following describes a method for determining power consumption of a turned-on fan.

An amount of the power consumption of the turned-on fan is mainly determined by the quantity of turned-on fans and rotational speeds of the turned-on fans.

The rotate speed of the fan is determined by a temperature of the battery module. When the air conditioner performs refrigerating, a higher temperature of the battery module indicates a higher rotate speed of the fan, and a lower temperature of the battery module indicates a lower rotate speed of the fan. When the air conditioner performs heating, a lower temperature of the battery module indicates a higher rotate speed of the fan, and a higher temperature of the battery module indicates a lower rotate speed of the fan. A relationship between the rotate speed of the fan and the temperature of the battery module may be preset.

A relationship between a rotate speed of one fan and power consumption of the fan is pre-determined and stored. In some embodiments, the relationship between a rotate speed of one fan and power consumption of the fan is stored in a form of a data table.

In some embodiments, the quantity of fans is the same as a quantity of battery modules, and each fan is configured to adjust a gas flow speed around one corresponding battery module. To ensure evenness of temperatures of all of the battery modules, all of the fans are usually set to be turned on. The rotate speed of the fan is determined based on the temperature of the battery module. After a rotate speed of one fan is determined, power consumption of the fan at the rotate speed may be determined based on the relationship between a rotate speed of one fan and power consumption of the fan. Total power consumption of the turned-on fans may be determined based on the total quantity of fans and power consumption of one fan.

In some other embodiments, to reduce power consumption of the fans, only some fans may be turned on. In this case, the quantity of turned-on fans is determined by the temperature of the battery module. When the air conditioner performs refrigerating, a higher temperature of the battery module indicates more turned-on fans, and a lower temperature of the battery module indicates fewer turned-on fans. When the air conditioner performs heating, a lower temperature of the battery module indicates more turned-on fans, and a higher temperature of the battery module indicates fewer turned-on fans. A relationship between the quantity of turned-on fans and the temperature of the battery module may be preset. The quantity of turned-on fans is determined based on the temperature of the battery module, and a rotate speed of one fan is determined based on the temperature of the battery module. After determining a rotate speed of one fan, the controller determines power consumption of the fan at the rotate speed based on the relationship between a rotate speed of one fan and power consumption of the fan. The total power consumption of the turned on fans is determined based on the quantity of turned-on fans and power consumption of one fan.

S501g: Determine the correspondence between power consumption of the temperature control system and the plurality of different specified temperatures in the specified temperature set of the temperature control system based on the total power consumption of the turned-on fan and the correspondence between total power consumption of a turned-on air conditioner and the plurality of different specified temperatures in the specified temperature set of the temperature control system.

Division and sequence of the foregoing steps in embodiments of this application are merely for ease of description, and do not constitute a limitation on the method in this application. A person skilled in the art may adjust the division and sequence based on an actual situation.

In conclusion, according to the temperature control method for the energy storage system provided in this embodiment of this application, running energy consumption of the temperature control system is reduced, and running efficiency of the energy storage system is improved.

Based on the energy storage system provided in the foregoing embodiments, an embodiment of this application further provides a photovoltaic power generation system. The following provides detailed descriptions with reference to the accompanying drawings.

Figure 12:
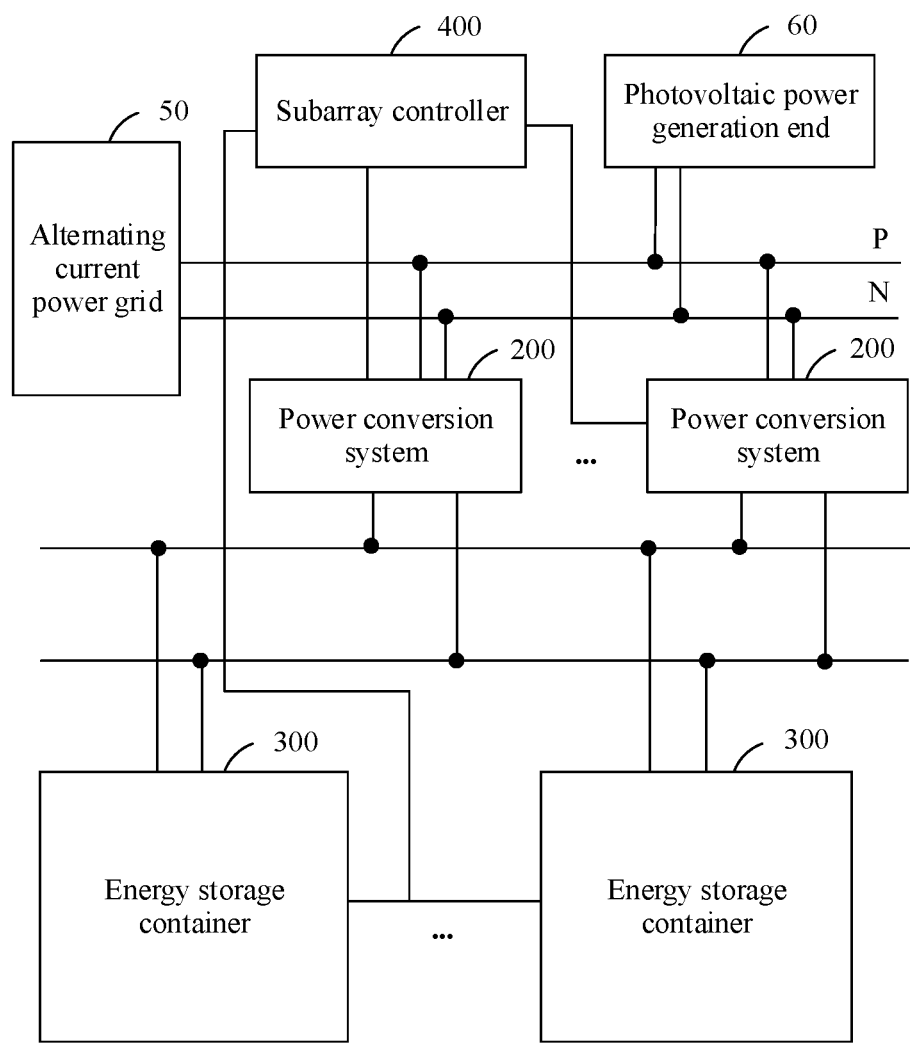
FIG. 12 is a schematic diagram of a photovoltaic power generation system according to an embodiment of this application.

FIG. 12 is a schematic diagram of a photovoltaic power generation system according to an embodiment of this application.

The photovoltaic power generation system shown in the FIGURE includes an energy storage system and a photovoltaic power generation end 60.

The energy storage system includes at least one energy storage container 300, at least one power conversion system (PCS) 200, and an alternating current bus.

The power conversion system 200 corresponds to the power conversion circuit 20 in FIG. 1.

The alternating current bus includes a positive alternating current bus (identified as P in the FIGURE) and a negative alternating current bus (identified as N in the FIGURE).

For a specific implementation of the energy storage container 300, refer to the related descriptions in the foregoing embodiment. Details are not described herein again.

In some embodiments, one energy storage container 300 is connected to one power conversion system 200 to form one energy storage branch, and the energy storage system includes at least one energy storage branch.

In some other embodiments, quantities of energy storage containers 300 and power conversion systems 200 are different.

The power conversion system 200 is a bidirectional direct current/alternating current (AC) converter, which may be a neutral point clamped T-type three-level circuit, a neutral point clamped (NPC) circuit, an active neutral point clamped (ANPC) circuit, a flying capacitor multilevel circuit, and the like.

A port voltage of one battery changes with an energy storage capacity, so that an output voltage of a port of a battery cluster in the energy storage container 300 is an output voltage in a wide range. Therefore, to match a voltage change range of the port of the battery cluster, the power conversion system 200 usually has a wide range of input and output capabilities.

Figure 13:
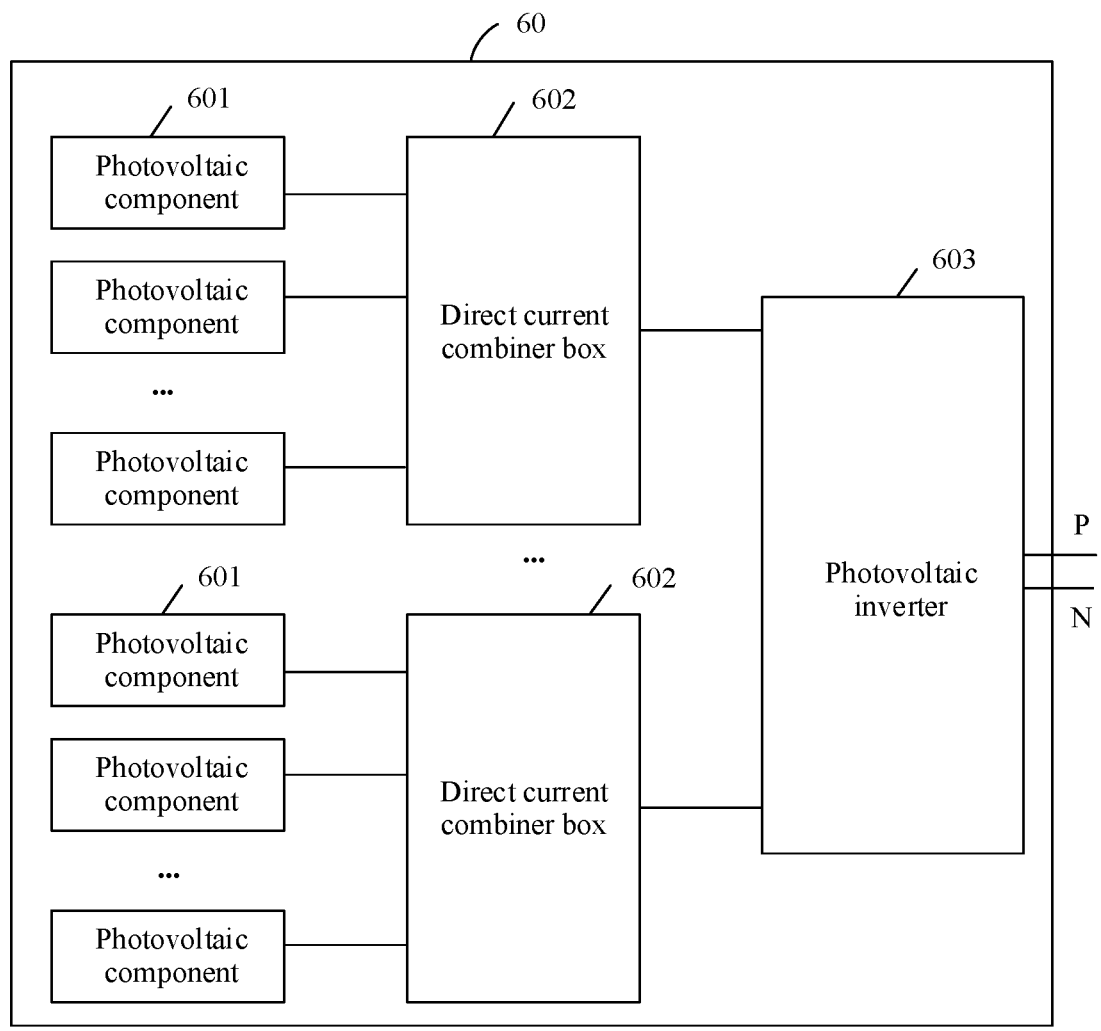
FIG. 13 is a schematic diagram of a photovoltaic power generation end according to an embodiment of this application.

FIG. 13 is a schematic diagram of a photovoltaic power generation end according to an embodiment of this application.

The photovoltaic power generation end shown in the FIGURE includes a photovoltaic component 601, a direct current combiner box 602, and a photovoltaic inverter 603.

The photovoltaic component 601 is configured to generate a direct current by using light energy. An input end of the direct current combiner box 602 is usually connected to a plurality of photovoltaic components 601, and an output end of the direct current combiner box 602 is connected to the photovoltaic inverter 603. The photovoltaic component 601 transmits the generated direct current to the photovoltaic inverter by using the direct current combiner box 602.

An output end of the photovoltaic inverter 603 is connected to an alternating current bus. The alternating current bus is also connected to an energy storage system and an alternating current power grid. The photovoltaic inverter 603 is configured to: convert the direct current into an alternating current, and transmit the alternating current to the power grid through the alternating current bus, or charge the energy storage system.

Figure 14:
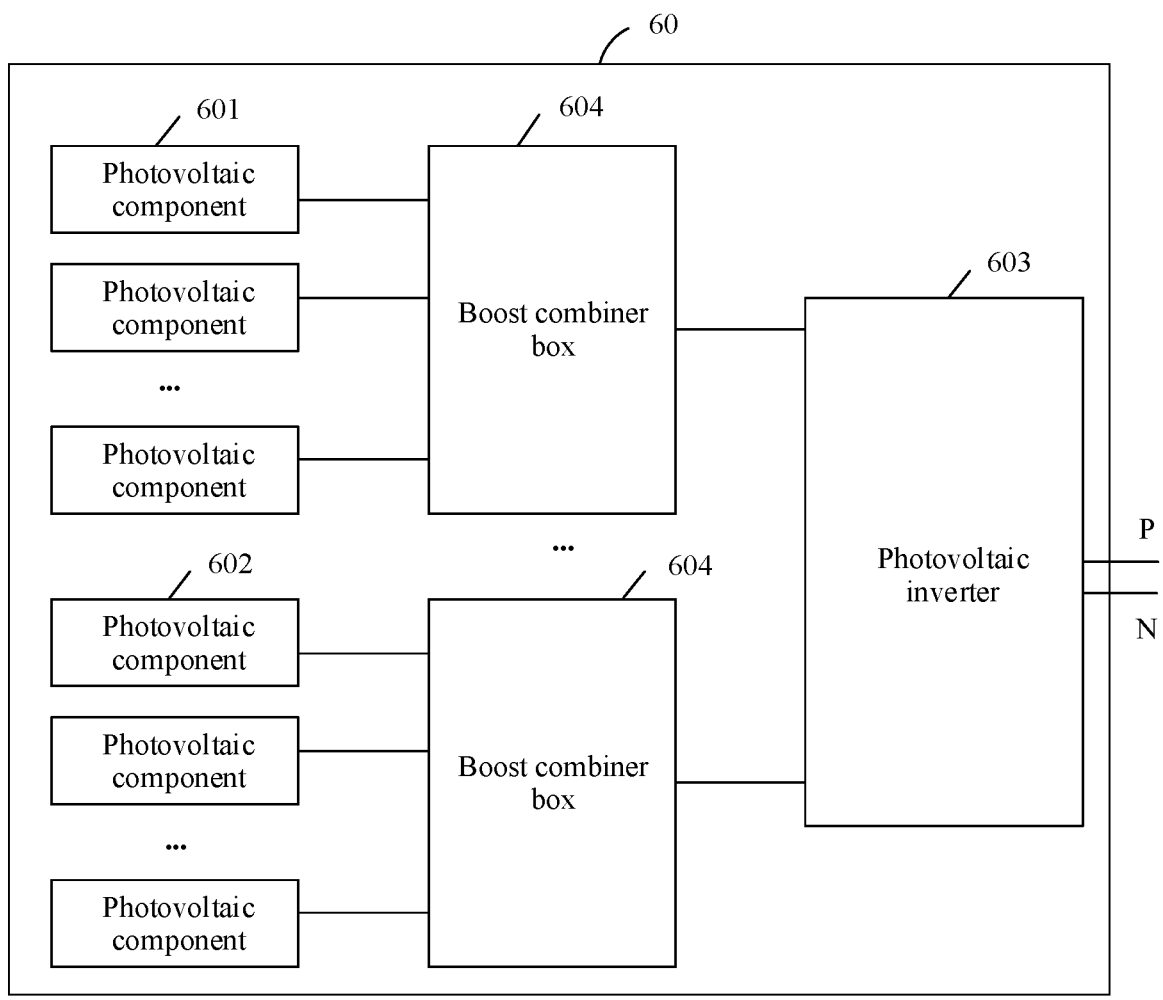
FIG. 14 is a schematic diagram of another photovoltaic power generation end according to an embodiment of this application.

FIG. 14 is a schematic diagram of another photovoltaic power generation end according to an embodiment of this application.

A difference between the photovoltaic power generation system shown in FIG. 14 and that shown in FIG. 13 lies in that a photovoltaic component 601 first outputs a direct current to a boost combiner box 604. The boost combiner box 604 has a maximum power point tracking (MPPT) function, and is a direct current boost converter.

During actual application, there may be one or more three-phase photovoltaic inverters 803 in the scenarios in FIG. 13 and FIG. 14. This is not specifically limited in this embodiment of this application.

A photovoltaic power generation end 60 has features of fluctuation and uncertainty, and an energy yield of the photovoltaic power generation end 60 fluctuates. When an alternating current output by the photovoltaic power generation end 60 is higher than a power consumption requirement of an alternating current power grid 50, excess electricity is converted into a direct current through the alternating current bus and by using a power conversion system 200, to charge a battery cluster in an energy storage system. When an alternating current output by the photovoltaic power generation end 60 is lower than a power consumption requirement of an alternating current power grid 50, a battery cluster in an energy storage system outputs a direct current, and the direct current is converted into an alternating current by a power conversion system 200 of the energy storage system and then output to the alternating current power grid 50, so that the alternating current power grid 50 tends to be stable.

In conclusion, the photovoltaic power generation system considers impact of a specified temperature of a temperature control system on an available capacity of the battery cluster when the battery cluster works at different specified temperatures of the temperature control system, and further considers impact of the specified temperature of the temperature control system on power consumption of the temperature control system. When a difference between the available capacity of the battery cluster and the power consumption of the temperature control system is maximum, it indicates that a ratio of the power consumption of the temperature control system to the available capacity of the battery cluster is minimum, and in this case, the energy storage system has the highest running efficiency. Therefore, a specified temperature, of the temperature control system, corresponding to a maximum difference between the available capacity of the battery cluster and the power consumption of the temperature control system is used as a target temperature, so that the temperature control system adjusts a temperature inside an energy storage container to the target temperature. In this way, running efficiency of the energy storage system can be improved, thereby improving running efficiency of the photovoltaic power generation system.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may represent a, b, c, "a and b", "a and c", "b and c", or "a, b, and c", where a, b, and c may be singular or plural.

Embodiments in this specification are all described in a progressive manner, for same or similar parts in embodiments, refer to these embodiments, and each embodiment focuses on a difference from other embodiments. In addition, some or all of the units and modules may be selected based on actual requirements, to achieve objectives of the solutions of embodiments. A person of ordinary skill in the art may understand and implement embodiments without creative efforts.

The foregoing descriptions are merely specific implementations of this application. It should be noted that a person of ordinary skill in the art may make several improvements and modifications without departing from the principle of this application, and the improvements and modifications shall fall within the protection scope of this application.

What is claimed is:

1. An energy storage system, comprising:
   at least one energy storage container, wherein each energy storage container comprises:
   a battery cluster comprising a plurality of battery modules connected in series, wherein each battery module of the plurality of battery modules comprises a plurality of batteries;
   a temperature control system configured to adjust a temperature inside the energy storage container to a target temperature; and
   a controller configured to determine a specified temperature of the temperature control system corresponding to a maximum difference between an available capacity of the battery cluster and a power consumption of the temperature control system as the target temperature, wherein the determination of the specified temperature is based on:
   a correspondence between the available capacity of the battery cluster and a plurality of different specified temperatures in a specified temperature set of the temperature control system, and
   a correspondence between the power consumption of the temperature control system and the plurality of different specified temperatures in the specified temperature set of the temperature control system.

2. The energy storage system according to claim 1, wherein a correspondence between available capacities of the battery cluster in different working states and the plurality of different specified temperatures in the specified temperature set of the temperature control system is pre-calibrated and stored.

3. The energy storage system according to claim 2, wherein the controller is further configured to:
  in response to the battery cluster being in a charging state, determine a correspondence between the available capacity of the battery cluster at a current charging rate and the plurality of different specified temperatures in the specified temperature set of the temperature control system;
  in response to the battery cluster being in a discharging state, determine a correspondence between the available capacity of the battery cluster at a current discharging rate and the plurality of different specified temperatures in the specified temperature set of the temperature control system; and
  in response to the battery cluster being in a silent state, determine a correspondence between the available capacity of the battery cluster in a current state of charge and the plurality of different specified temperatures in the specified temperature set of the temperature control system.

4. The energy storage system according to claim 1, wherein:
  the temperature control system comprises a plurality of air conditioners configured to adjust the temperature inside the energy storage container; and
  a plurality of fans configured to adjust gas flow speeds around the plurality of battery modules, wherein the controller is further configured to:
    determine a correspondence between a total power consumption of a turned-on air conditioner and the plurality of different specified temperatures in the specified temperature set of the temperature control system,
    determine a total power consumption of a turned-on fan, and
    determine the correspondence between the power consumption of the temperature control system and the plurality of different specified temperatures in the specified temperature set of the temperature control system based on the total power consumption of the turned-on fan and the correspondence between the total power consumption of the turned-on air conditioner and the plurality of different specified temperatures in the specified temperature set of the temperature control system.

5. The energy storage system according to claim 4, wherein:
  all of the plurality of fans are configured to be turned on; and
  the controller is further configured to:
    determine rotational speeds of the plurality of fans based on temperatures of the plurality of battery modules; and
    determine a total power consumption of the plurality of fans based on a total quantity of the plurality of fans and the rotational speeds of the plurality of fans.

6. The energy storage system according to claim 4, wherein the controller is specifically configured to:
  determine a quantity of turned-on fans and rotational speeds of turned-on fans of the plurality of fans based on temperatures of the plurality of battery modules; and
  determine a total power consumption of turned-on fans of the plurality of fans based on the quantity of turned-on fans and the rotational speeds of the turned-on fans.

7. The energy storage system according to claim 4, wherein the controller is further configured to:
  determine a correspondence between a total refrigerating capacity associated with the energy storage container and the plurality of different specified temperatures in the specified temperature set of the temperature control system;
  determine a correspondence between a refrigerating capacity of one air conditioner and the plurality of different specified temperatures in the specified temperature set of the temperature control system;
  determine a correspondence between a quantity of turned-on air conditioners and the plurality of different specified temperatures in the specified temperature set of the temperature control system based on the correspondence between the total refrigerating capacity required by the energy storage container and the plurality of different specified temperatures in the specified temperature set of the temperature control system and the correspondence between the refrigerating capacity of one air conditioner and the plurality of different specified temperatures in the specified temperature set of the temperature control system; and
  determine the correspondence between the total power consumption of the turned-on air conditioner and the plurality of different specified temperatures in the specified temperature set of the temperature control system based on the correspondence between the quantity of turned-on air conditioners and the plurality of different specified temperatures in the specified temperature set of the temperature control system and a correspondence between a power consumption of one air conditioner and the plurality of different specified temperatures in the specified temperature set of the temperature control system.

8. The energy storage system according to claim 7, wherein the controller is further configured to:
  determine, based on solar radiation intensity and an outer surface area of the energy storage container, heat transferred by solar heat radiation to the inside of the energy storage container;
  determine, based on a heat transfer coefficient of the energy storage container, the outer surface area of the energy storage container, and a current temperature outside the energy storage container, a correspondence between heat transferred from the outside of the energy storage container to the inside of the energy storage container through heat conduction and the plurality of different specified temperatures in the specified temperature set of the temperature control system;
  determine, based on working time of the plurality of battery modules, working currents of the plurality of battery modules, internal resistances of the plurality of battery modules, and open circuit voltages of the plurality of battery modules, heat generated during working of the plurality of battery modules; and
  determine, based on the heat transferred by solar heat radiation to the inside of the energy storage container, the correspondence between heat transferred from the outside of the energy storage container to the inside of the energy storage container through heat conduction and the plurality of different specified temperatures in the specified temperature set of the temperature control system, and the heat generated during working of the plurality of battery modules, the correspondence between a total refrigerating capacity required by the energy storage container and the plurality of different specified temperatures in the specified temperature set of the temperature control system.

9. The energy storage system according to claim 8, wherein the controller is further configured to determine the working time of the plurality of battery modules and the working currents of the plurality of battery modules based on received running information.

10. The energy storage system according to claim 7, wherein:
   a correspondence between refrigerating capacities, of one air conditioner, corresponding to different temperatures outside the energy storage container and the plurality of different specified temperatures in the specified temperature set of the temperature control system is pre-calibrated and stored; and
   the controller is further configured to determine a correspondence between a refrigerating capacity, of one air conditioner, corresponding to a current temperature outside the energy storage container and the plurality of different specified temperatures in the specified temperature set of the temperature control system.

11. The energy storage system according to claim 7, wherein:
   a correspondence between a power consumption, of one air conditioner, corresponding to different temperatures outside the energy storage container and the plurality of different specified temperatures in the specified temperature set of the temperature control system is pre-calibrated and stored; and
   the controller is further configured to determine a correspondence between power consumption, of one air conditioner, corresponding to a current temperature outside the energy storage container and the plurality of different specified temperatures in the specified temperature set of the temperature control system.

12. The energy storage system according to claim 8, further comprising a first temperature sensor, wherein
   the first temperature sensor is disposed outside the energy storage container; and
   the first temperature sensor is configured to detect a temperature outside the energy storage container, and send a detection result to the controller.

13. A temperature control method for an energy storage system comprising at least one energy storage container, wherein each energy storage container comprises a temperature control system and a battery cluster, the battery cluster comprises a plurality of battery modules connected in series, each battery module comprises a plurality of batteries, and the temperature control system is configured to adjust a temperature inside the energy storage container, the method comprising:
   determining a specified temperature of the temperature control system corresponding to a maximum difference between an available capacity of the battery cluster and a power consumption of the temperature control system as a target temperature, wherein determining the specified temperature is based on:
      a correspondence between the available capacity of the battery cluster and a plurality of different specified temperatures in a specified temperature set of the temperature control system, and
      a correspondence between the power consumption of the temperature control system and the plurality of different specified temperatures in the specified temperature set of the temperature control system; and
   adjusting the temperature inside the energy storage container to the target temperature.

14. The temperature control method according to claim 13, further comprising:
   before determining the specified temperature, pre-calibrating and storing a correspondence between available capacities of the battery cluster in different working statuses and the plurality of different specified temperatures in the specified temperature set of the temperature control system.

15. The temperature control method according to claim 13, further comprising, before determining the specified temperature:
   in response to the battery cluster being in a charging state, determining a correspondence between the available capacity of the battery cluster at a current charging rate and the plurality of different specified temperatures in the specified temperature set of the temperature control system;
   in response to the battery cluster being in a discharging state, determining a correspondence between the available capacity of the battery cluster at a current discharging rate and the plurality of different specified temperatures in the specified temperature set of the temperature control system; and
   in response to the battery cluster being in a silent state, determining a correspondence between the available capacity of the battery cluster in a current state of charge and the plurality of different specified temperatures in the specified temperature set of the temperature control system.

16. The temperature control method according to claim 13, wherein:
   the temperature control system comprises a plurality of air conditioners and a plurality of fans; and
   the method further comprises before the determining the specified temperature:
   determining a correspondence between a total power consumption of a turned-on air conditioner and the plurality of different specified temperatures in the specified temperature set of the temperature control system, and determining a total power consumption of a turned-on fan; and
   determining the correspondence between the power consumption of the temperature control system and the plurality of different specified temperatures in the specified temperature set of the temperature control system based on the total power consumption of the turned-on fan and the correspondence between the total power consumption of the turned-on air conditioner and the plurality of different specified temperatures in the specified temperature set of the temperature control system.

17. The temperature control method according to claim 16, wherein:
   all of the plurality of fans are turned on; and
   determining the total power consumption of the turned-on fan comprises:
      determining rotational speeds of the plurality of fans based on temperatures of the plurality of battery modules, and
      determining a total power consumption of the plurality of fans based on a total quantity of the plurality of fans and the rotational speeds of the plurality of fans.

18. The temperature control method according to claim 16, wherein determining the total power consumption of the turned-on fan comprises:

determining a quantity of turned-on fans and rotational speeds of the turned-on fans based on temperatures of the plurality of battery modules; and determining the total power consumption of the turned-on fans based on the quantity of turned-on fans and the rotational speeds of the turned-on fans.

19. The temperature control method according to claim 16, wherein determining the correspondence between the total power consumption of the turned-on air conditioner and the plurality of different specified temperatures in the specified temperature set of the temperature control system further comprises:

determining a correspondence between a total refrigerating capacity required by the energy storage container and the plurality of different specified temperatures in the specified temperature set of the temperature control system;

determining a correspondence between a refrigerating capacity of one air conditioner and the plurality of different specified temperatures in the specified temperature set of the temperature control system;

determining a correspondence between a quantity of turned-on air conditioners and the plurality of different specified temperatures in the specified temperature set of the temperature control system based on the correspondence between the total refrigerating capacity required by the energy storage container and the plurality of different specified temperatures in the specified temperature set of the temperature control system and the correspondence between the refrigerating capacity of one air conditioner and the plurality of different specified temperatures in the specified temperature set of the temperature control system; and determining the correspondence between the total power consumption of the turned-on air conditioner and the plurality of different specified temperatures in the specified temperature set of the temperature control system based on the correspondence between the quantity of turned-on air conditioners and the plurality of different specified temperatures in the specified temperature set of the temperature control system and a correspondence between power consumption of one air conditioner and the plurality of different specified temperatures in the specified temperature set of the temperature control system.

20. A photovoltaic power generation system, comprising:

an alternating current bus configured to be coupled to an alternating current power grid;

a photovoltaic inverter comprising an output coupled to the alternating current bus, the photovoltaic inverter configured to convert direct current into an alternating current, and provide the alternating current for the alternating current power grid through the alternating current bus or charge an energy storage system;

a plurality of photovoltaic components coupled to an input of the photovoltaic inverter, each photovoltaic component of the plurality of photovoltaic components configured to generate the direct current from light energy, and transmit the direct current to the photovoltaic inverter; and the energy storage system comprising at least one energy storage container, wherein each energy storage container comprises:

a temperature control system configured to adjust a temperature inside the energy storage container to a target temperature, a battery cluster comprising a plurality of battery modules connected in series, wherein each battery module of the plurality of battery modules comprises a plurality of batteries, a controller configured to determine a specified temperature of the temperature control system corresponding to a maximum difference between an available capacity of the battery cluster and a power consumption of the temperature control system as the target temperature, wherein the determination of the specified temperature is based on:

a correspondence between the available capacity of the battery cluster and a plurality of different specified temperatures in a specified temperature set of the temperature control system, and a correspondence between the power consumption of the temperature control system and the plurality of different specified temperatures in the specified temperature set of the temperature control system.

* * * * *

UNITED STATES PATENT AND TRADEMARK OFFICE
CERTIFICATE OF CORRECTION

PATENT NO. : 12,326,743 B2  
APPLICATION NO. : 18/506619  
DATED : June 10, 2025  
INVENTOR(S) : Ma et al.

Page 1 of 1

It is certified that error appears in the above-identified patent and that said Letters Patent is hereby corrected as shown below:

In the Claims

In Column 35, in Claim 11, Line 31, after "between" insert -- a --.

Signed and Sealed this
Eighth Day of July, 2025

Coke Morgan Stewart
*Acting Director of the United States Patent and Trademark Office*